United States Patent
Omi

(10) Patent No.: US 8,405,321 B2
(45) Date of Patent: Mar. 26, 2013

(54) DRIVE UNIT, SMOOTHING CIRCUIT, DC/DC CONVERTER

(75) Inventor: Masaki Omi, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 1217 days.

(21) Appl. No.: 12/178,793

(22) Filed: Jul. 24, 2008

(65) Prior Publication Data

US 2009/0026977 A1    Jan. 29, 2009

(30) Foreign Application Priority Data

Jul. 26, 2007  (JP) .................................. 2007-194087
Dec. 27, 2007  (JP) .................................. 2007-336878

(51) Int. Cl.
*G05F 1/00* (2006.01)
*H05B 37/02* (2006.01)

(52) U.S. Cl. ........................................ 315/294; 315/291

(58) Field of Classification Search .................. 315/291, 315/307, 241 R, 246, 247, 306, 294
See application file for complete search history.

(56) References Cited

U.S. PATENT DOCUMENTS

| | | | | |
|---|---|---|---|---|
| 5,587,650 A * | 12/1996 | Massie | ............................ | 323/282 |
| 5,627,741 A | 5/1997 | Naruo et al. | | |
| 6,195,255 B1 * | 2/2001 | Kim | ............................ | 361/679.19 |
| 6,476,568 B2 * | 11/2002 | Urakabe et al. | ............... | 315/307 |
| 6,860,954 B2 * | 3/2005 | Mamada | .................... | 156/89.12 |
| 6,995,524 B2 * | 2/2006 | Takahashi | ..................... | 315/307 |
| 7,372,213 B2 * | 5/2008 | Kuo et al. | ...................... | 315/282 |
| 7,564,434 B2 * | 7/2009 | Kim | ................................ | 345/82 |
| 7,948,078 B2 * | 5/2011 | Hiraga | .......................... | 257/724 |
| 2002/0007908 A1 | 1/2002 | Mamda | | |
| 2002/0034059 A1 | 3/2002 | Kijima et al. | | |
| 2005/0024813 A1 | 2/2005 | Shimizu et al. | | |
| 2005/0258891 A1 * | 11/2005 | Ito et al. | ........................ | 327/538 |
| 2007/0047100 A1 | 3/2007 | Takahashi | | |
| 2007/0262448 A1 * | 11/2007 | Ishino | .......................... | 257/738 |
| 2007/0296353 A1 * | 12/2007 | Ito et al. | ........................ | 315/307 |
| 2009/0027930 A1 * | 1/2009 | Usui | ............................... | 363/84 |

FOREIGN PATENT DOCUMENTS

| | | |
|---|---|---|
| CN | 1139313 A | 1/1997 |
| JP | 64-54788 U | 4/1989 |
| JP | 7-231651 | 8/1995 |
| JP | 2000-232030 | 8/2000 |
| JP | 2000-277883 | 10/2000 |
| JP | 2001-023849 | 1/2001 |
| JP | 2002-94210 | 3/2002 |
| JP | 2004/328950 | 11/2004 |

(Continued)

OTHER PUBLICATIONS

Official communication from the State Intellectual Property Office of the People's Republic of China for Chinese patent application 200810134371.3, with English translation (communication dated Apr. 19, 2012).

*Primary Examiner* — Douglas W Owens
*Assistant Examiner* — Minh D A
(74) *Attorney, Agent, or Firm* — Fish & Richardson P.C.

(57) ABSTRACT

A drive unit has a load driving portion driving a load by a PWM drive method; a soft-start function portion for achieving a soft-start function; and a soft-start disabling portion counting a time elapsed after a PWM signal is turned on at start-up of the unit, and disabling the soft-start function when a count value reaches a predetermined value.

7 Claims, 47 Drawing Sheets

(a) FRONT FACE OF SUBSTRATE (b) BACK FACE OF SUBSTRATE

FOREIGN PATENT DOCUMENTS

| | | |
|---|---|---|
| JP | 2005-50962 | 2/2005 |
| JP | 2006-211762 | 8/2006 |
| JP | 2007-013183 | 1/2007 |
| JP | 2007-028698 | 2/2007 |
| JP | 2007-068338 | 3/2007 |

* cited by examiner

FIG. 2

| PIN NUMBER | TERMINAL NAME | In/Out | FUNCTION | TERMINAL EQUIVALENT CIRCUIT DIAGRAM |
|---|---|---|---|---|
| 1 | VDET | In | DETECTION INPUT PIN FOR SBD Open ANDOVERVOLTAGE PROTECTION | C |
| 2 | N.C. | - | No connect PIN | F |
| 3 | GND | - | GND | B |
| 4 | SW | Out | SWITCHING Tr GATE DRIVE TERMINAL | G |
| 5 | SENSP | In | OVERCURRENT DETECTION PLUS-SIDE TERMINAL | G |
| 6 | TEST | In | TEST INPUT PIN (PULLED DOWN TO GND WITH100kΩ) | G |
| 7 | SENSN | In | OVERCURRENT DETECTION MINUS-SIDE TERMINAL | A |
| 8 | GND | - | GND | B |
| 9 | ISETH | In | CURRENT SETTING TERMINAL WHEN PWMDRV=H | A |
| 10 | ISETL | In | STARTING CURRENT SETTING TERMINAL WHEN PWMDRV=L | A |
| 11 | PWMDRV | In | PWM INPUT PIN FOR TURNING ON/OFF ONLY DRIVER | E |
| 12 | LED1 | In | CURRENT DRIVER sink TERMINAL | C |
| 13 | LED2 | In | CURRENT DRIVER sink TERMINAL | C |
| 14 | LED3 | In | CURRENT DRIVER sink TERMINAL | C |
| 15 | GND | - | GND | B |
| 16 | LED4 | In | CURRENT DRIVER sink TERMINAL | C |
| 17 | LED5 | In | CURRENT DRIVER sink TERMINAL | C |
| 18 | LED6 | In | CURRENT DRIVER sink TERMINAL | C |
| 19 | FAILSEL | In | PROTECTION FUNCTION LATCH SELECTION PIN | E |
| 20 | GND | - | GND | B |
| 21 | RSTB | In | RISET PIN L :RESET H :CLEAR RESET | E |
| 22 | VREG | Out | REGULATOR OUTPUT/ INTERNAL POWER SOURCE | D |
| 23 | PWMPOW | In | PWM PIN FOR POWER ON/OFF | E |
| 24 | VBAT | In | BATTERY INPUT | C |

FIG. 8

| ITEM | SYMBOL | SPECIFICATION VALUES | | | UNIT | CONDITION |
|---|---|---|---|---|---|---|
| | | MINIMUM | NORMAL | MAXIMUM | | |
| FAILSEL,PWMDRV TERMINALS | | | | | | |
| L LEVEL INPUT VOLTAGE | VthL | 0 | - | 0.2 | V | |
| H LEVEL INPUT VOLTAGE 1 | VthH1 | 1.4 | - | 5.0 | V | VBAT>5.0V |
| H LEVEL INPUT VOLTAGE 2 | VthH2 | 1.4 | - | VBAT | V | VBAT<5.0V |
| INPUT CURRENT | Iin | - | 8.3 | 14.0 | μA | INPUT TERMINAL=2.5V |
| PWMPOW TERMINAL | | | | | | |
| L LEVEL INPUT VOLTAGE | PWML | 0 | - | 0.2 | V | |
| H LEVEL INPUT VOLTAGE 1 | PWMH1 | 1.4 | - | 5.0 | V | VBAT>5.0V |
| H LEVEL INPUT VOLTAGE 2 | PWMH2 | 1.4 | - | VBAT | V | VBAT<5.0V |
| PWMPULL-DOWN RESISTANCE | PWMR | 300 | 500 | 700 | kΩ | |
| RSTB TERMINAL | | | | | | |
| L LEVEL INPUT VOLTAGE | RSTBL | 0 | - | 0.2 | V | |
| H LEVEL INPUT VOLTAGE 1 | RSTBH1 | 2.25 | 2.5 | 5.0 | V | VBAT>5.0V |
| H LEVEL INPUT VOLTAGE 2 | RSTBH2 | 2.25 | 2.5 | VBAT | V | VBAT<5.0V |
| OPERATING CURRENT | IRSTB | - | 89 | 134 | μA | RSTB=2.5V, LED1-6=3V |
| REGULATOR | | | | | | |
| VREG TERMINAL VOLTAGE | VREG | 4.0 | 5.0 | 6.0 | V | NO LOAD |
| LOW-VOLTAGE DETECTION VOLTAGE | UVLO | 2.05 | 2.25 | 2.65 | V | |
| SWITCHING REGULATOR | | | | | | |
| REST CURRENT 1 | Iq1 | - | 0.6 | 3.4 | μA | RSTB=0V, VBAT=12V |
| REST CURRENT 2 | Iq2 | - | 4.6 | 10 | μA | RSTB=0V, VBAT=22V |
| OPERATING CURRENT | Idd | - | 3.4 | 5.1 | mA | VDET=0V,ISETH=24kΩ |
| LED CONTROL VOLTAGE | VLED | 0.4 | 0.5 | 0.6 | V | |
| OVERCURRENT LIMIT DETECTION VOLTAGE | Ocp | 70 | 100 | 130 | mV | *1 |
| SCHOTTLY DIODE OPEN PROTECTION | Sop | - | - | 0.1 | V | DETECTION VOLTAGE AT VDET TERMINAL |
| SWITCHING FREQUENCY | fSW | 0.8 | 1.0 | 1.2 | MHz | |
| MAXIMUM DUTY | Duty | 92.5 | 95.0 | 99.0 | % | LED1-6=0.3V |
| OVERVOLTAGE LIMIT | Ovl | 43.0 | 44.7 | 46.4 | V | LED1-6=0.3V |
| CURRENT DRIVER | | | | | | |
| LED MAXIMUM CURRENT | ILMAX | - | - | 25 | mA | |
| LED CURRENT VARIATIONS | ILACCU | - | - | ±5 | % | ILED=16mA |
| LED CURRENT MATCHING | ILMAT | - | - | ±3 | % | EACH LED CURRENT/AVERAGE CURRENT OF LEDS 1-6 |
| ISET TERMINAL VOLTAGE | Iset | 0.5 | 0.6 | 0.7 | V | |
| LED CURRENT LIMITER | ILOCP | 35 | 60 | 90 | mA | CURRENT LIMIT VALUE WHEN ISET RESISTANCE IS SET TO 4.7 kΩ LED1, 2, 3, 4, 5, 6=0.5V |
| LED TERMINAL OVERVOLTAGE PROTECTION | LEDOVP | 10.0 | 11.5 | 13.0 | V | RSTB=PWMDRV=2.5V |

(*1) THIS ITEM IS MEASURED USING DC.

FIG. 9
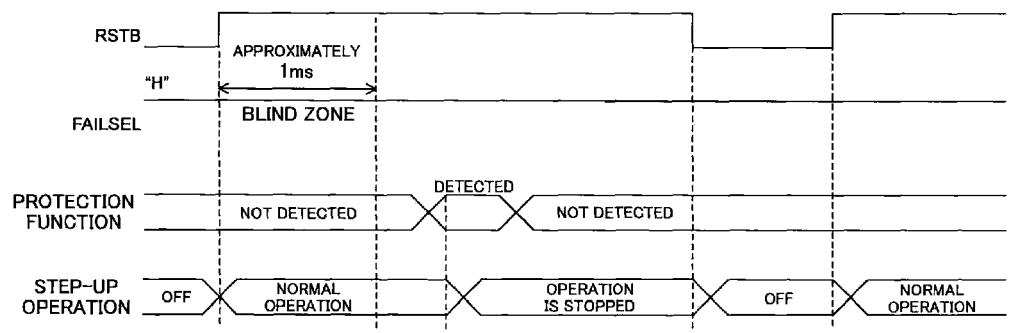
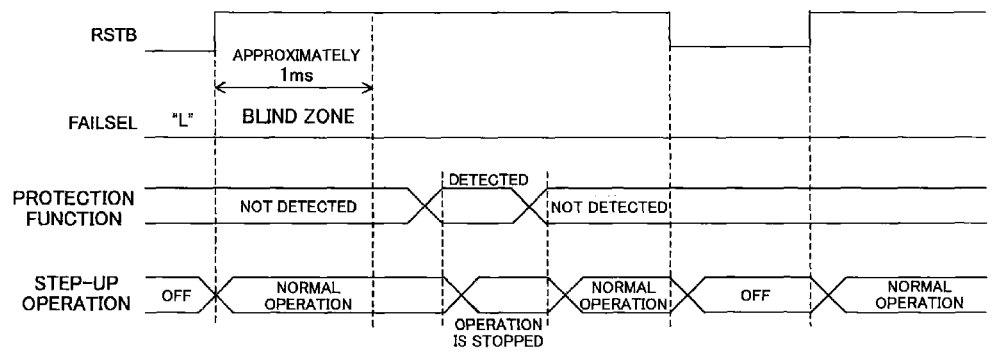

FIG. 10
< IF OFF PERIOD IS SET BY USING PWMPOW >
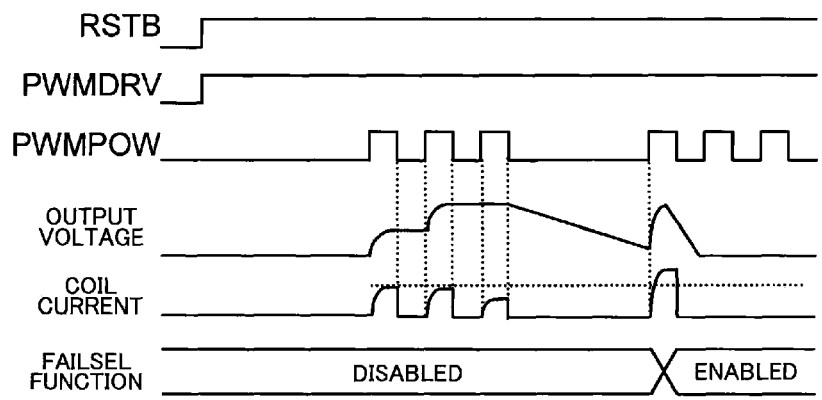
< IF OFF PERIOD IS SET BY USING RSTB >
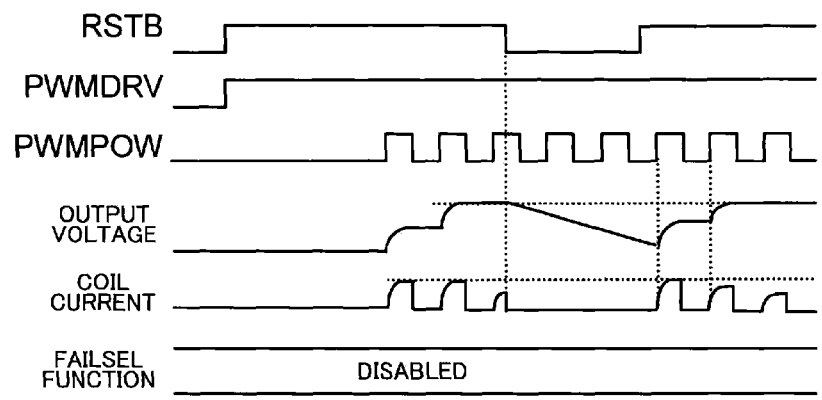

FIG. 13

| NUMBER OF LED LINES IN USE | NUMBER OF LINES CONNECTED TO GROUND | RSTB CONSUMPTION CURRENT |
|---|---|---|
| 6 | 0 | 0.23mA |
| 5 | 1 | 0.41mA |
| 4 | 2 | 0.60mA |
| 3 | 3 | 0.79mA |
| 2 | 4 | 0.98mA |
| 1 | 5 | 1.16mA |
| 0 | 6 | 1.35mA |

FIG. 14

| RSTB | PWMPOW | PWMDRV | IC | LED CURRENT |
|---|---|---|---|---|
| 1 | 0 | 0 | OFF | OFF |
| 1 | 1 | 0 | ON | STARTING CURRENT DETERMINED BY ISETL |
| 1 | 0 | 1 | OFF | OFF |
| 1 | 1 | 1 | ON | CURRENT DETERMINED BY ISETH |
| 0 | 0, 1 | 0, 1 | OFF | OFF |

FIG. 20

| PWM ADJUSTMENT METHOD | EFFICIENCY WHEN LED CURRENT IS 0.5 mA (PWM Duty=2.5%) | VARIATIONS (MEASURED VALUE) AT MINIMUM DUTY CYCLE WHEN PWM FREQUENCY IS 200 Hz |
|---|---|---|
| CURRENT DRIVER | 70% | 0.2% |
| POWER CONTROL | 93% | 0.5% |

FIG. 28
(a) FRONT FACE OF SUBSTRATE
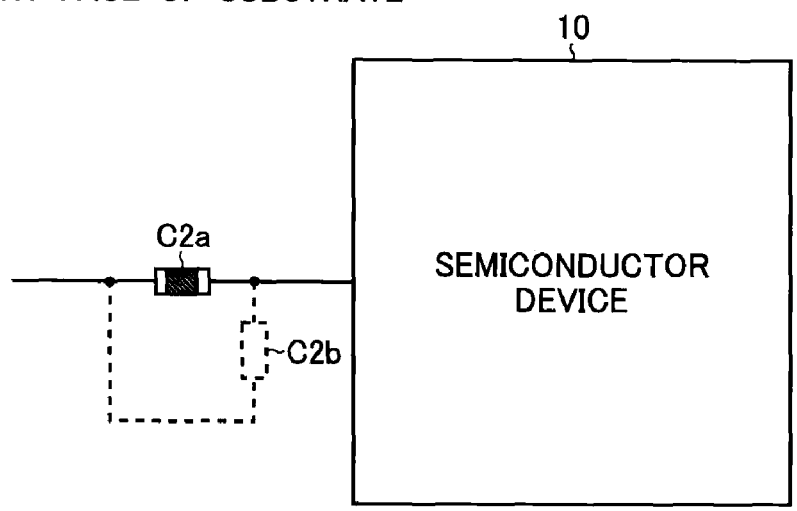
(b) BACK FACE OF SUBSTRATE
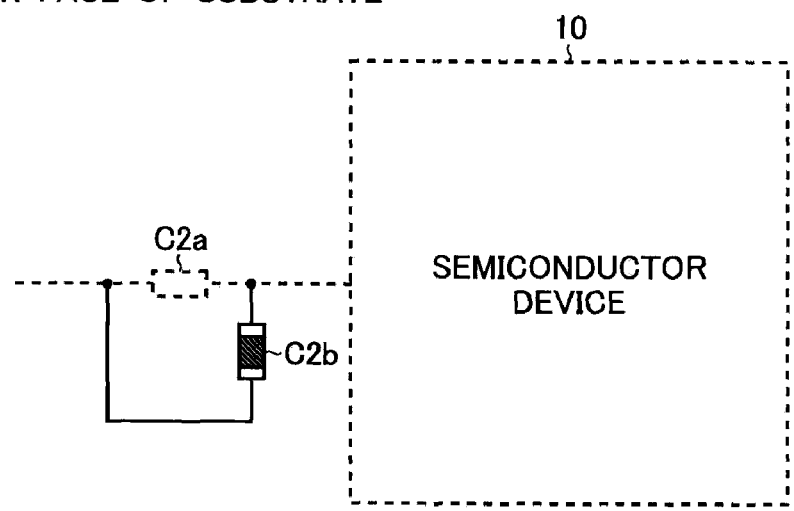

FIG. 42
(a)
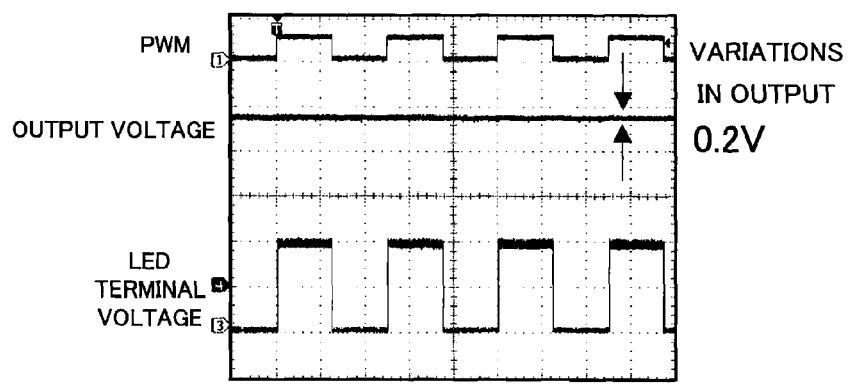
(b)
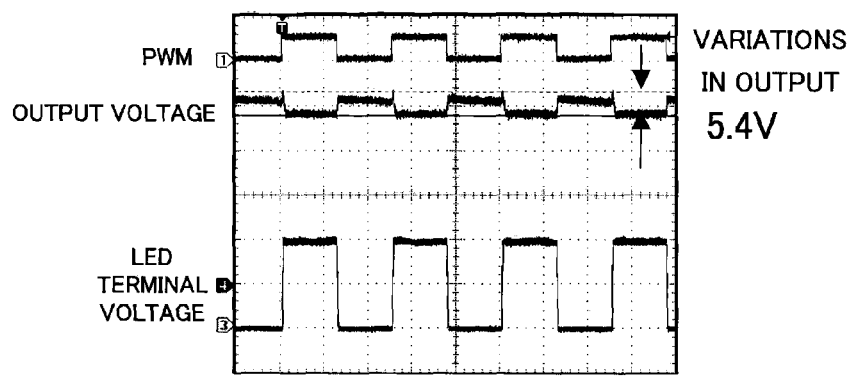

DRIVE UNIT, SMOOTHING CIRCUIT, DC/DC CONVERTER

This application is based on Japanese Patent Applications Nos. 2007-194087 and 2007-336878 filed on Jul. 26, 2007 and Dec. 27, 2007 respectively, the contents of which are hereby incorporated by reference.

BACKGROUND OF THE INVENTION

1. Field of the Invention

The present invention relates to drive units that control the driving of a load (such as a light-emitting diode). The present invention also relates to smoothing circuits that smooth an alternating-current signal by using an output capacitor connected in parallel with the load, and to DC/DC converters that convert an input voltage into a desired output voltage and feed it to the load.

2. Description of Related Art

Currently, as a backlight of an LCD (liquid crystal display) panel (for example, a monitor of a car navigation system), cold cathode fluorescent lamps (CCFL) are mainly used. In recent years, however, white LEDs (light-emitting diodes) have been put to practical use for their advantages such as light weight, thinness, resistance to vibration and impact, wide brightness adjustment range, power-saving, longer life, low drive voltage, and being free from Hg, and various technologies related to LED drive units (so-called LED drivers) that control the driving of such white LEDs have been disclosed and proposed (see, for example, JP-A-2007-13183 (hereinafter "Patent Document 1")).

As LEDs have come to be increasingly used as a backlight, the LED drivers that drive the LEDs are required to have a longer battery life or to reduce power consumption by reducing the brightness of a screen, and accordingly LED drive units are required to have the capability of controlling the LED brightness at lower brightness levels with a high degree of accuracy.

Like the above-described LED drive units, drive units that drive loads other than LEDs are required to have the capability of controlling the load at lower driving levels with a high degree of accuracy.

In addition, with respect to a DC/DC converter that converts an input voltage into a desired output voltage and feeds it to the load, the following problem arises. If voltage variation appears in an input bypass capacitor which is an input smoother of the DC/DC converter or an output capacitor which is an output smoother of the DC/DC converter, the device may expand and contract, causing a substrate to tremble and make a sound. This sound is easily produced especially when the input bypass capacitor or the output capacitor has a large capacitance, because this results in an increase in device size.

SUMMARY OF THE INVENTION

In view of the problems described above, a first object of the present invention is to provide drive units that can control a load at lower driving levels with a high degree of accuracy; a second object is to provide smoothing circuits that can reduce the sound attributable to an output capacitor, and to provide drive units using such smoothing circuits; and a third object is to provide DC/DC converters that can reduce the sound attributable to an input bypass capacitor, and to provide drive units using such DC/DC converters.

To achieve the above-described first object, according to one aspect of the present invention, a drive unit is provided with: a load driving portion driving a load by a PWM drive method; a soft-start function portion for achieving a soft-start function; and a soft-start disabling portion counting a time elapsed after a PWM signal is turned on at start-up of the unit, and disabling the soft-start function when a count value reaches a predetermined value.

To achieve the above-described second object, according to another aspect of the present invention, a smoothing circuit is provided with an output capacitor connected in parallel with a load, the output capacitor smoothing an alternating-current signal. Here, the output capacitor comprises a plurality of capacitors connected in parallel.

To achieve the above-described third object, according to another aspect of the present invention, a DC/DC converter is provided with: an input bypass capacitor connected between a node to which an input voltage is applied and a ground, the input bypass capacitor smoothing the input voltage; and a voltage converting portion converting the input voltage smoothed by the input bypass capacitor into a desired output voltage, and feeding the desired output voltage to a load. Here, the input bypass capacitor comprises a plurality of capacitors connected in parallel.

Other features, elements, steps, advantages and characteristics of the present invention will become more apparent from the following detailed description of preferred embodiments thereof with reference to the attached drawings.

BRIEF DESCRIPTION OF THE DRAWINGS

FIG. 2 is a table showing a pin number of an external terminal, and the corresponding name of terminal, input/output distinction, and function, and a terminal equivalent circuit diagram group to which it belongs;

FIG. 8 is a table showing the electrical characteristics of the semiconductor device 10;

FIG. 9 is a diagram illustrating the operation of the FAILSEL terminal;

FIG. 10 is a diagram illustrating lights-out control performed when the FAILSEL terminal takes a high level;

FIG. 13 is a table showing examples of consumption current when RSTV=5 V;

FIG. 14 is a table of logical values, illustrating start-up control and LED current selection control;

FIG. 20 is a diagram showing the features of current driver PWM dimming and power control PWM dimming;

FIG. 28 is a diagram showing another example of how the output capacitor C2 is disposed;

FIG. 42 is a diagram illustrating the effect of reducing variations in output voltage;

DETAILED DESCRIPTION OF PREFERRED EMBODIMENTS

Figure 1:
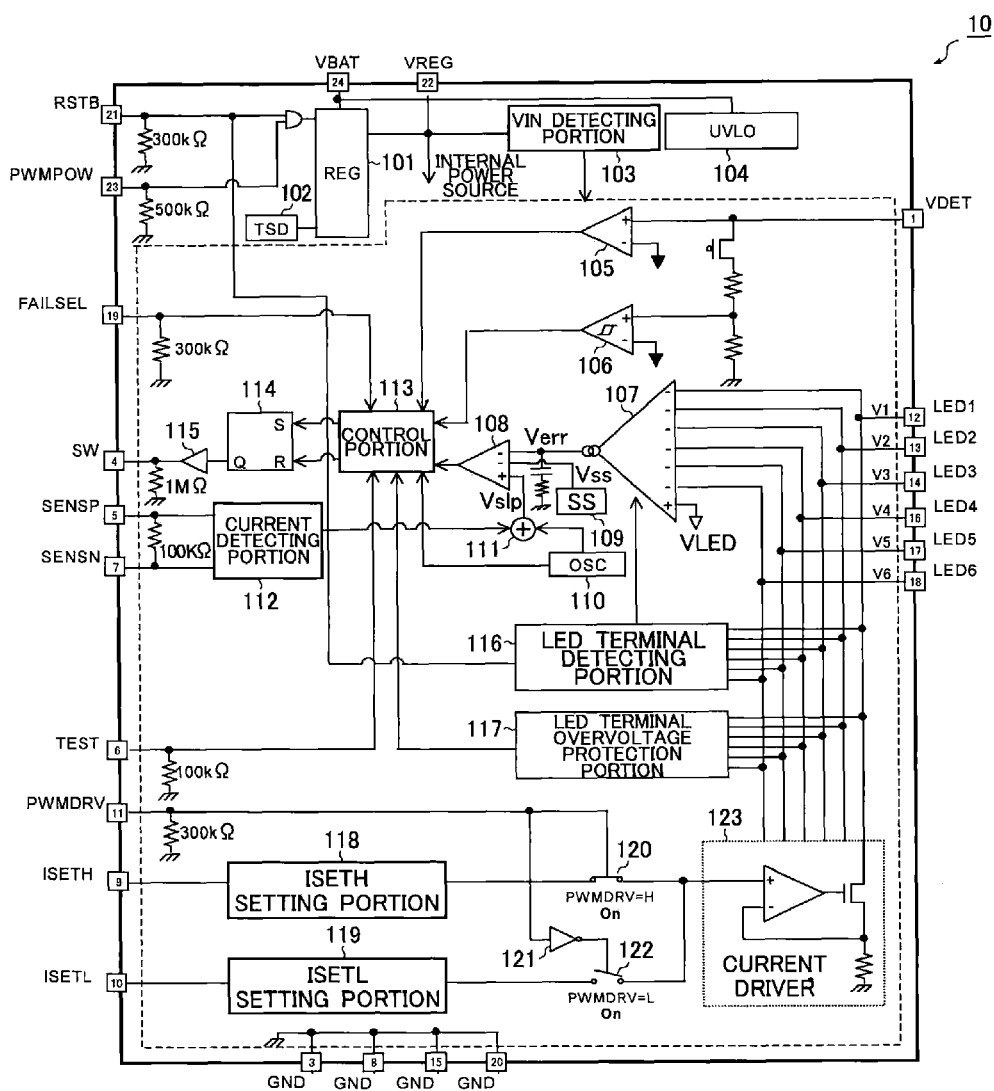
FIG. 1 is a block diagram showing a semiconductor device of an embodiment according to the present invention.

FIG. 1 is a block diagram showing a semiconductor device of an embodiment according to the present invention.

First, an outline of the semiconductor device 10 of this embodiment will be described.

The semiconductor device 10 of this embodiment shown in FIG. 1 is a white LED driver IC into which a DC/DC converter of PWM (pulse width modulation) type, the DC/DC converter that can step up a voltage up to 42.5 V, and a current driver that can drive LEDs at up to 25 mA are integrated. By controlling a power control terminal (PWMPOW terminal) of the IC or a power control terminal (PWMDRV terminal) of the current driver with a PWM signal fed from outside, it is possible to perform brightness control with high accuracy over a wide range. In addition, the adoption of a high-precision current driver helps reduce the error between lines, making it suitable to reduce variations in brightness of the display. Furthermore, the semiconductor device 10 adopts a compact package contributing to miniaturization of the substrate and space saving.

Next, the features of the semiconductor device 10 of this embodiment will be described.

The first feature lies in that the semiconductor device 10 incorporates a high-efficiency DC/DC converter of PWM type (fsw=1 MHz, peak efficiency=93%). The second feature lies in that the semiconductor device 10 incorporates a high-precision matching (±3%) current driver (6 channels). The third feature lies in that the semiconductor device 10 can drive up to 72 white LEDs (=twelve LEDs in series in each of six parallel lines). The fourth feature lies in that the semiconductor device 10 can deal with a wide input voltage range (2.7 to 22 V). The fifth feature lies in that the semiconductor device 10 incorporates various protection circuits (an overvoltage protection portion, an overcurrent protection portion, an external SBD disconnection protection portion, and a thermal shutdown portion). The sixth feature lies in that the semiconductor device 10 is housed in a compact package (4.0 mm×4.0 mm×1.0 mm).

The semiconductor device 10 of this embodiment can be suitably used as a driver of a backlight of a medium-sized LCD panel that is incorporated in mobile notebook-size personal computers, portable DVD players, car navigation systems, and the like.

As shown in FIG. 1, the semiconductor device 10 of this embodiment provided with these features is composed of an internal voltage producing portion 101 (hereinafter a "REG portion 101"), a temperature protection portion 102 (hereinafter a "TSD (thermal shutdown) portion 102"), an internal voltage detecting portion 103, an undervoltage protection portion 104 (hereinafter a "UVLO (undervoltage lockout) portion 104"), a Schottky barrier diode disconnection protection portion 105 (hereinafter an "SBD (Schottky barrier diode) disconnection protection portion 105"), an overvoltage protection portion 106 (hereinafter an "OVP (overvoltage protection) portion 106"), an error amplifier 107, a PWM comparator 108, a soft-start portion 109, an oscillator portion 110, a slope voltage producing portion 111, a current detecting portion 112, a control logic portion 113, an SR flip-flop 114, a driver 115, an LED terminal detecting portion 116, an LED terminal overvoltage protection portion 117, a first current (ISETH) setting portion 118, a second current (ISETL) setting portion 119, a switch 120, an inverter 121, a switch 122, and a current driver 123, which are integrated into the semiconductor device 10.

The semiconductor device 10 of this embodiment has 24 external terminals (1 to 24 pins) for establishing electrical connection with the outside.

Figure 3:
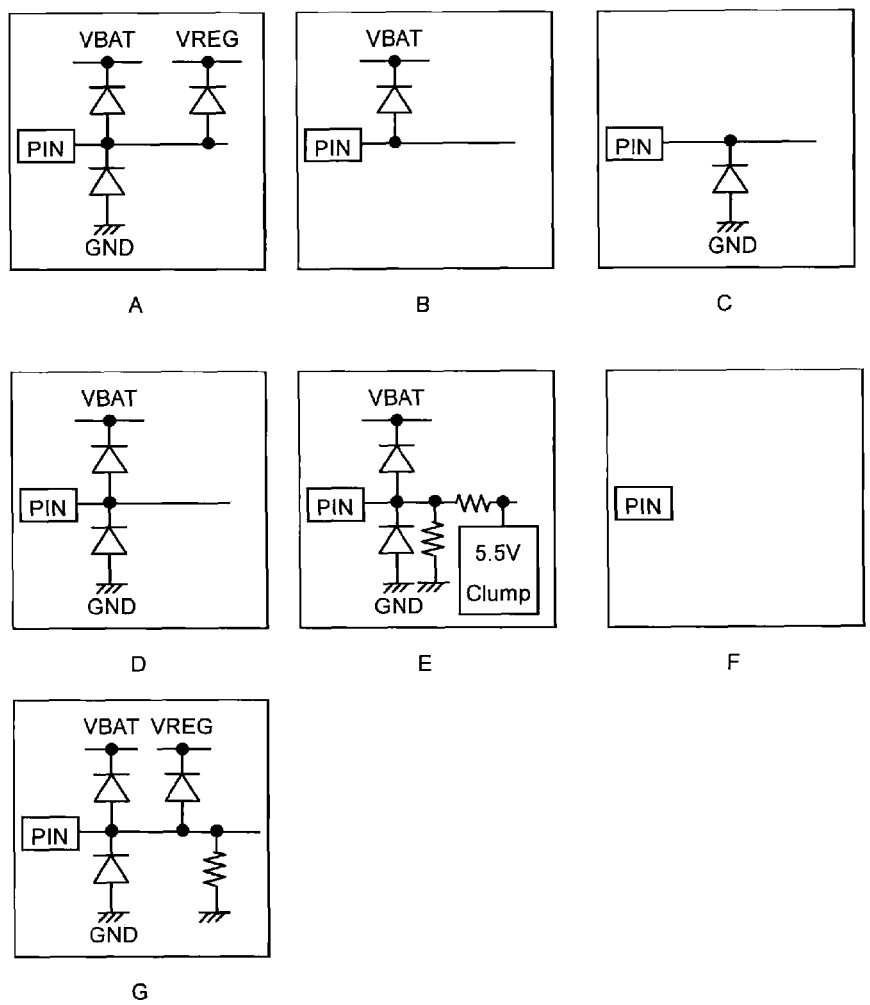
FIG. 3 shows input/output equivalent circuit diagrams (groups A to G) of the external terminals.

FIG. 2 is a table showing a pin number of an external terminal, and the corresponding name of terminal, input/output distinction, and function, and a terminal equivalent circuit diagram group to which it belongs. FIG. 3 shows input/output equivalent circuit diagrams (groups A to G) of the external terminals. As shown in FIG. 3, the external terminals of the semiconductor device 10 are each connected to a static protection diode.

Next, with reference to application examples shown in FIGS. 4 to 7, how to handle the external terminals will be explained in detail.

Figure 4:
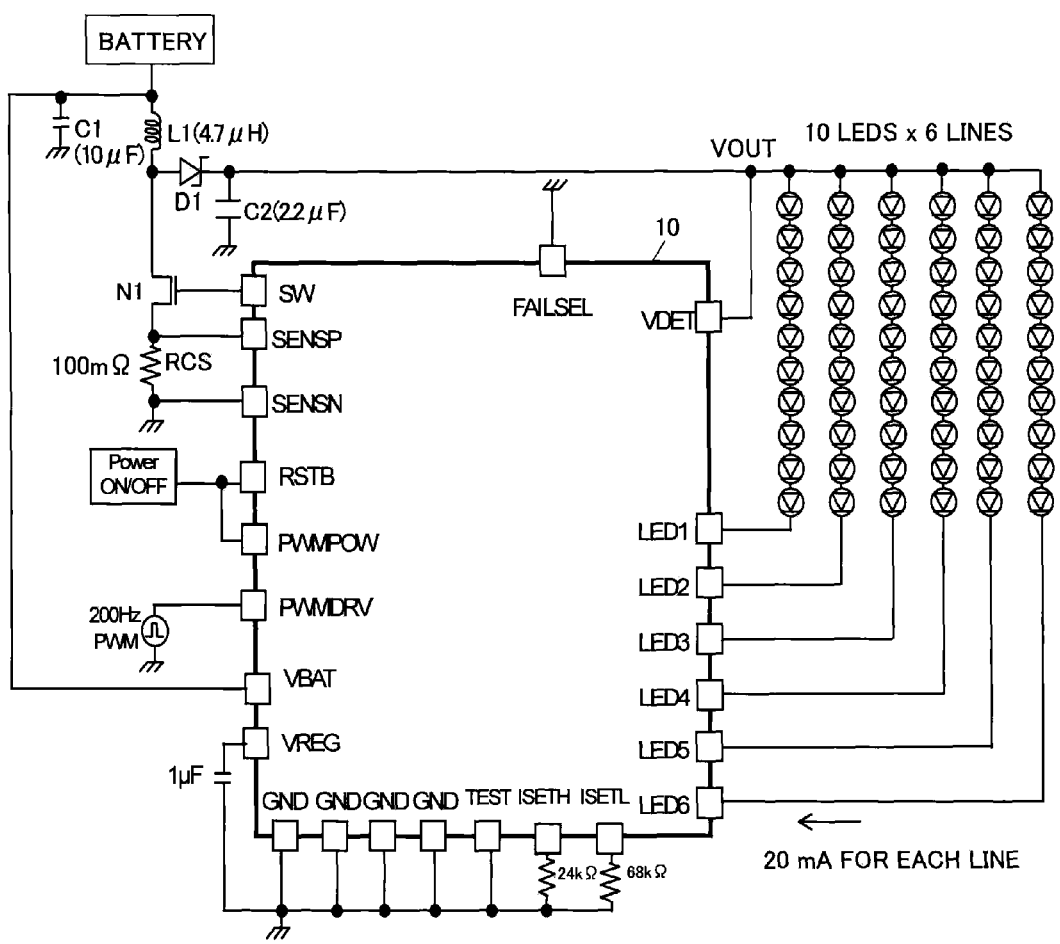
FIG. 4 is a diagram showing an application of current driver PWM dimming, in which ten LEDs are arranged in six parallel lines, the LED current is set to 20 mA, and the starting current is set to 8.8 µA.

FIG. 4 is a diagram showing an application of current driver PWM dimming, in which ten LEDs are arranged in six parallel lines, the LED current is set to 20 mA, and the starting current is set to 8.8 μA.

Figure 5:
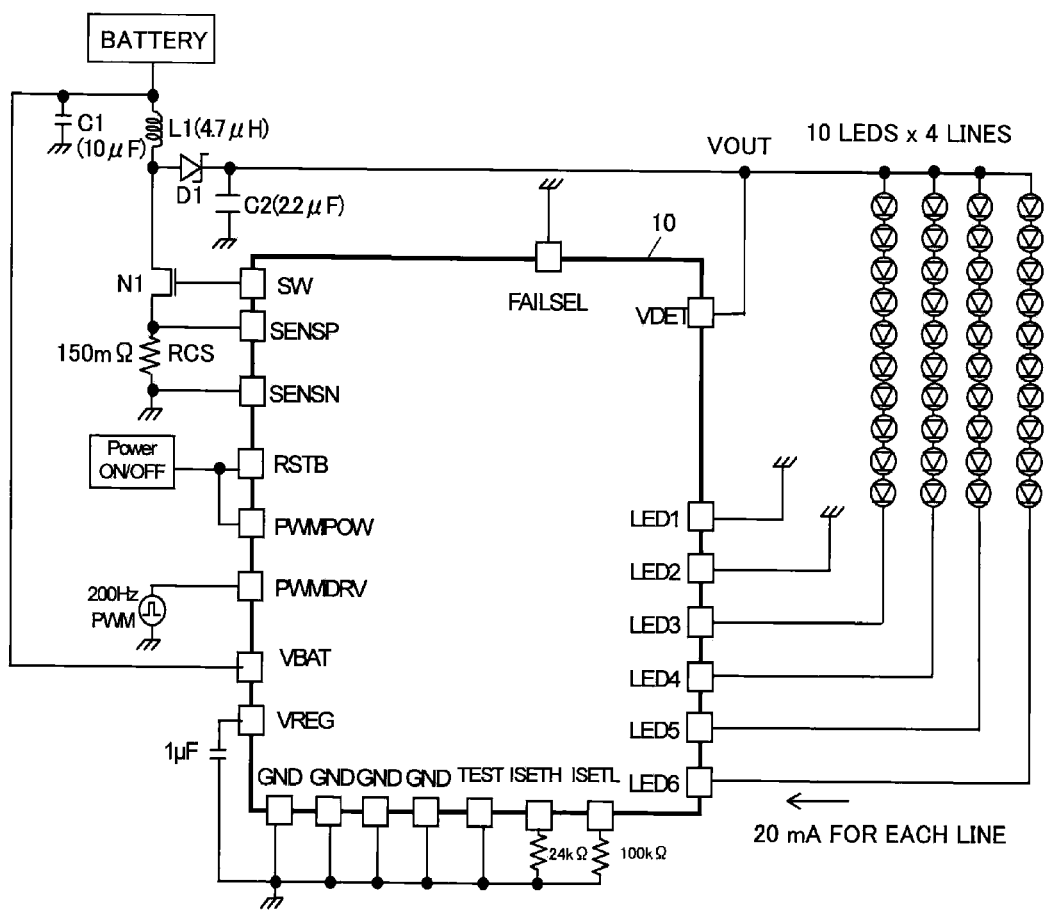
FIG. 5 is a diagram showing an application of current driver PWM dimming, in which ten LEDs are arranged in four parallel lines, the LED current is set to 20 mA, and the starting current is set to 6 µA.

FIG. 5 is a diagram showing an application of current driver PWM dimming, in which ten LEDs are arranged in four parallel lines, the LED current is set to 20 mA, and the starting current is set to 6 μA.

Figure 6:
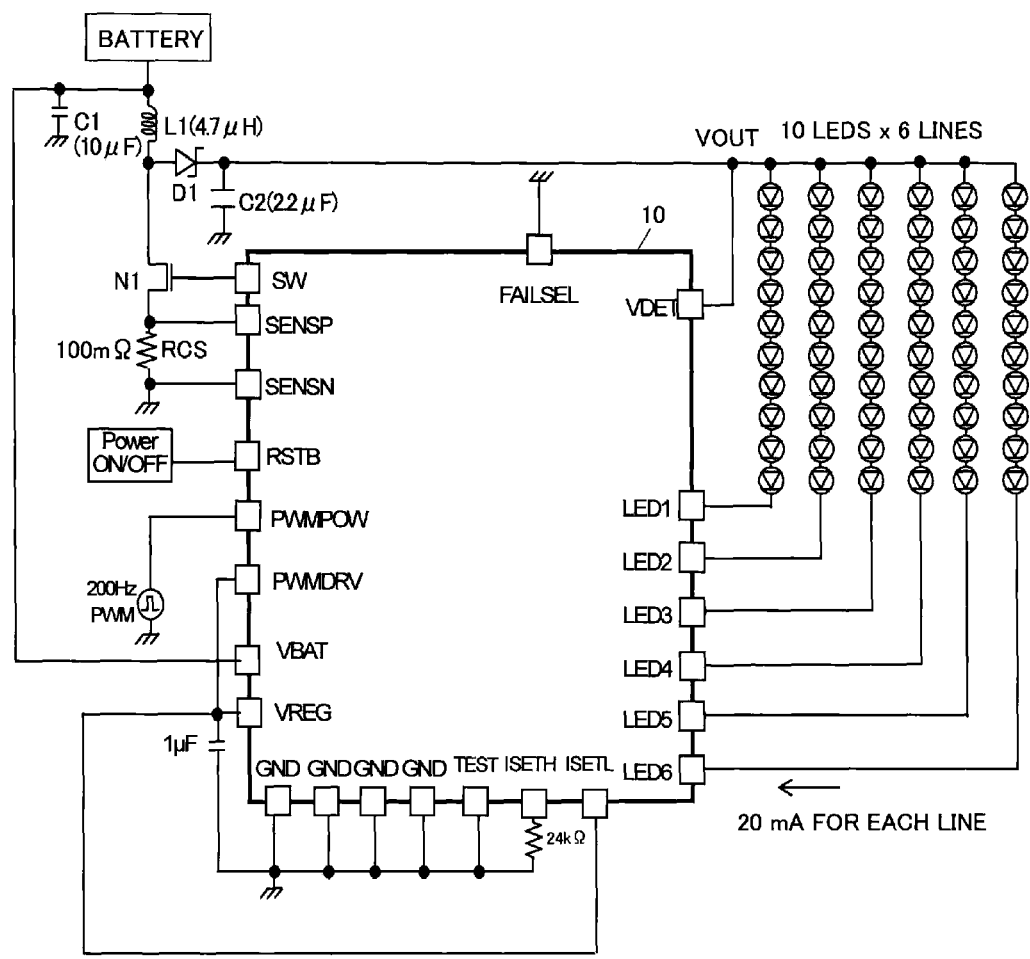
FIG. 6 is a diagram showing an application of power control PWM dimming, in which ten LEDs are arranged in six parallel lines and the LED current is set to 20 mA.

FIG. 6 is a diagram showing an application of power control PWM dimming, in which ten LEDs are arranged in six parallel lines and the LED current is set to 20 mA.

Figure 7:
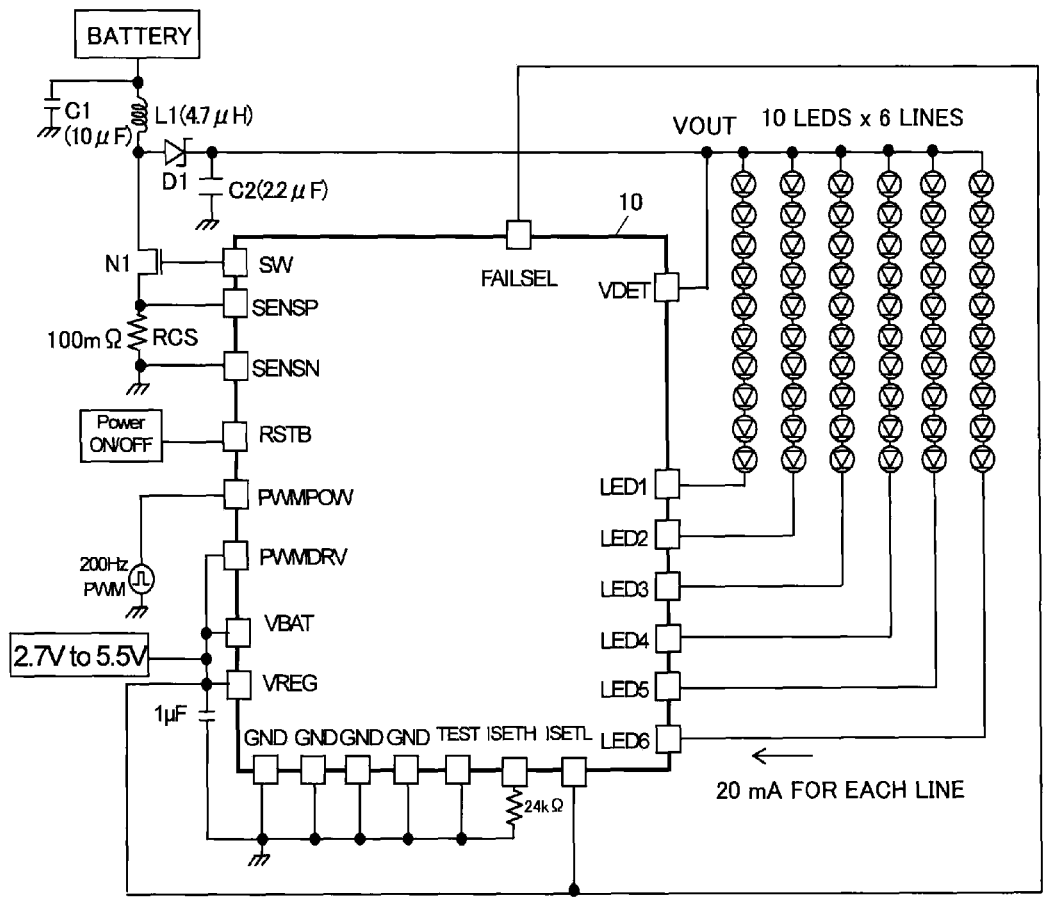
FIG. 7 is a diagram showing an application, in which an internal REG is not used or the circuit operates on a voltage of 5 V or less.

FIG. 7 is a diagram showing an application, in which an internal REG is not used or the circuit operates on a voltage of 5 V or less.

The TEST terminal (6 pin) is an external terminal for testing, and therefore should be connected to the GND terminal of the semiconductor device 10 in normal use (see FIGS. 4 to 7).

Though not expressly specified, the N.C. terminal (2 pin) is preferably open.

In a case where the semiconductor device 10 is driven by feeding a voltage of 2.7 to 5.5 V from outside, the VREG terminal (22 pin) is shorted with the VBAT terminal (24 pin), and a desired voltage is applied to the VREG terminal (see FIG. 7).

In a case where the FAILSEL terminal (19 pin) and the PWMDRV terminal (11 pin) are fixed at a low level, they are grounded (see FIGS. 4 to 6). On the other hand, in a case where the FAILSEL terminal and the PWMDRV terminal are fixed at a high level, they are connected to the VREG terminal or a power supply line with a voltage of 1.4 V or higher (see FIG. 7).

Of the LED1 terminal (12 pin), the LED2 terminal (13 pin), the LED3 terminal (14 pin), the LED4 terminal (16 pin), the LED5 terminal (17 pin), and the LED6 terminal (18 pin), unused channels are grounded (see FIG. 5).

The GND terminals (3 pin, 8 pin, 15 pin, and 20 pin) are connected to one another inside the semiconductor device 1, and are each connected to the ground line of the substrate (see FIGS. 4 to 7).

In any of the application examples shown in FIGS. 4 to 7, it is preferable that a capacitor having a small variation in bias be selected as a capacitor externally connected to the semiconductor device 10.

Current driver dimming shown in FIGS. 4 and 5 and power control dimming shown in FIGS. 6 and 7 will be explained later in detail.

FIG. 8 is a table showing the electrical characteristics of the semiconductor device 10 configured as described above. Unless otherwise specified, the electrical characteristics shown in FIG. 8 are the numerical values obtained when the power supply voltage VBAT is 12 V, the high level input voltage RSTB is 2.5 V, and ambient temperature Ta is +25° C.

Next, with reference to FIGS. 1 and 4 to 7 described above, the step-up DC/DC converter of the semiconductor device 10 will be explained in detail.

First, an external connection of the semiconductor device 10 will be explained; in particular, circuit elements (an N-channel field-effect transistor N1, a coil L1, a Schottky barrier diode D1, a resistor RCS, and capacitors C1 and C2) related to the step-up DC/DC converter will be explained in detail.

As shown in FIGS. 4 to 7, the gate of the transistor N1 is connected to the SW terminal (4 pin). The drain of the transistor N1 is connected to one end of the coil L1 and to the anode of the diode D1. The other end of the coil L1 is connected to a node to which a battery voltage VBAT is applied. The cathode of the diode D1 is connected to the anode of a line of LEDs, which serves as a load. The source of the transistor N1 is connected to the ground via the resistor RCS. One end (a high potential end) of the resistor RCS is connected to the SENSP terminal (5 pin), and the other end (a low potential end) thereof is connected to the SENSN terminal (7 pin). One end of the capacitor C1 is connected to the node to which the battery voltage VBAT is applied, and the other end thereof is connected to the ground. One end of the capacitor C2 is connected to the cathode of the diode D1, and the other end thereof is connected to the ground.

Next, basic operation (DC/DC conversion operation) of the step-up DC/DC converter will be explained in detail.

The transistor N1 is an output power transistor that is so controlled as to be turned on/off according to the terminal voltage of the SW terminal.

When the transistor N1 is turned on, a switch current flows through the coil L1 toward the ground via the transistor N1, and electric energy is stored in the coil L1. If electric charge has already been stored in the capacitor C2 in the on period of the transistor N1, a current from the capacitor C2 flows through the load, namely a line of LEDs. At this point, since the anode potential of the diode D1 drops to nearly a ground potential via the transistor N1, the diode D1 is reverse-biased. This prevents a current from flowing from the capacitor C2 toward the transistor N1.

On the other hand, when the transistor N1 is turned off, a counter-electromotive voltage is produced in the coil L1, whereby the electric energy stored therein is liberated. At this point, since the diode D1 is forward-biased, the current flowing through the diode D1 flows into the load, namely a line of LEDs, and also flows into the ground via the capacitor C2, thereby charging the capacitor C2. The aforementioned operation is repeatedly performed, whereby a direct-current output that is stepped up and smoothed by the capacitor C2 is fed to the load, namely a line of LEDs.

As described above, the semiconductor device 10 of this embodiment functions as one component element of a chopper step-up circuit that produces an output voltage VOUT by stepping up the battery voltage VBAT by driving the coil L1, which is an energy storage element, by controlling on/off of the transistor N1.

Next, peak-current-mode-controlled output feedback control will be explained in detail.

The error amplifier 107 produces an error voltage Verr by amplifying a difference between the lowest value of the LED terminal voltages V1 to V6 that are applied to the first to sixth inverting input terminals (−), respectively, and a predetermined LED control voltage VLED inputted to the non-inverting input terminal (+). That is, the lower the output voltage VOUT than a target value, the higher the voltage level of the error voltage Verr.

The PWM comparator 108 compares either the error voltage Verr applied to a first inverting input terminal (−) or a soft-start voltage Vss applied to a second inverting input terminal (−), whichever is lower, with a slope voltage Vslp (a voltage obtained by adding a triangular wave voltage produced by the oscillator portion 110a and a current detection voltage (a current detection signal produced by the resistor RCS) produced by the current detecting portion 112) applied to the non-inverting input terminal (+), and thereby produces a comparison signal having a duty ratio commensurate with the comparison result. That is, if the error voltage Verr (or the soft-start voltage Vss) is higher than the slope voltage Vslp, the logic of the comparison signal takes a low level; if the error voltage Verr (or the soft-start voltage Vss) is lower than the slope voltage Vslp, the logic of the comparison signal takes a high level. In the oscillator portion 110, subharmonic oscillation is prevented from occurring when the triangular wave voltage is produced.

The on-duty ratio (the ratio of the on period of the transistor N1 to a unit period) of the comparison signal under normal operating conditions varies depending on which of the error voltage Verr and the slope voltage Vslp is relatively higher than the other.

The control portion 113 performs switching control of the transistor N1 by receiving the above-described comparison signal and producing a set signal and a reset signal to be fed to the SR flip-flop 114. Specifically, the set signal and the reset signal are produced such that a high level is outputted to the gate of the transistor N1 while the comparison signal is at a low level, and that a low level is outputted to the gate of the transistor N1 while the comparison signal is at a high level. In addition, the control portion 113 monitors different protection signals in the semiconductor device 10. If an abnormal condition is found to occur in any one of them, the control portion 113 immediately stops the switching operation of the transistor N1.

As described above, in the peak-current-mode-controlled DC/DC converter, the driving of the transistor N1 is controlled based not only on the monitoring result of the LED terminal voltages V1 to V6 (and hence the output voltage VOUT) but also on the monitoring result of the switch current flowing through the transistor N1. Thus, according to the semiconductor device 10 of this embodiment, even when the error voltage Verr cannot follow a sharp variation in load, it is possible to directly control the driving of the transistor N1 according to the monitoring result of the switch current flowing through the transistor N1. This makes it possible to effectively suppress variations in the output voltage VOUT. That is, the semiconductor device 10 of this embodiment eliminates the need to use a large-capacity capacitor as the capacitor C2, making it possible to prevent an unnecessary increase in cost and an undesirable increase in the size of the capacitor C2.

Next, soft-start control of the step-up DC/DC converter will be explained.

Immediately after the start-up of the semiconductor device 10, the output voltage VOUT is zero, and therefore the error voltage Verr becomes extremely high. Thus, comparison between the error voltage Verr and the slope voltage Vslp results in an excessively large duty ratio of the comparison signal, allowing an excessive current to flow through the load, namely a line of LEDs, and the coil L1.

To avoid this, the semiconductor device 10 of this embodiment is so configured that, in addition to the error voltage Verr, a soft-start voltage Vss is inputted to the PWM comparator 108 such that, if the soft-start voltage Vss is lower than the error voltage Verr, the duty ratio of a PWM signal is determined according to the result of comparison between the soft-start voltage Vss that is lower than the error voltage Verr and the slope voltage Vslp independently of the error voltage Verr.

In the semiconductor device 10 of this embodiment, the soft-start circuit 109 is so configured as to produce the soft-start voltage Vss that starts to increase gently after the start-up of the device by passing a predetermined constant current through a capacitor.

As described above, with a configuration in which the soft-start circuit 109 is provided, it is possible to prevent an excessive current from flowing into the load and the coil L1 at start-up of the device.

In the semiconductor device 10 of this embodiment, after the RSTB terminal (21 pin) is turned from a low level to a high level, a soft-start function is enabled only for a predetermined period of time (1 ms) after the PWMPOW terminal (23 pin) is turned from a low level to a high level. Thereafter, even when the PWMPOW terminal is turned from a low level to a high level, the soft-start function is not enabled. In addition, in a case where a high level interval of the PWMPOW terminal is 1 ms or less, if three or more pulses are inputted to the PWMPOW terminal, the soft-start function is disabled. The disabled state of the soft-start function is terminated by turning the RSTB terminal from a high level to a low level. The above-described control to enable/disable the soft-start function will be explained later in detail.

Next, the FAILSEL terminal (19 pin) will be explained.

The semiconductor device 10 of this embodiment includes various types of abnormal condition protection portions. If any abnormal condition occurs, the semiconductor device 10 stops a step-up operation with the above-described protection functions, and prevents the elements from being broken down or from overheating and catching fire. In so doing, it is possible to choose how to stop the step-up operation with the protection functions by means of the FAILSEL terminal. The protection functions to be controlled include overvoltage protection, SBD disconnection protection, thermal shutdown, LED terminal overvoltage protection, and overcurrent protection.

FIG. 9 is a diagram illustrating the operation of the FAILSEL terminal.

As shown in the upper portion of FIG. 9, if a protection function operates while the FAILSEL terminal is at a high level, the step-up operation is stopped, and then the step-up operation stays in the stopped state. Incidentally, turning the RSTB terminal to a low level terminates the stopped state of the step-up operation, whereby the step-up operation is resumed.

On the other hand, as shown in the lower portion of FIG. 9, if a protection function operates while the FAILSEL terminal is at a low level, the step-up operation is temporarily stopped, and, once the abnormal condition becomes undetected, the step-up operation is automatically resumed. That is, the semiconductor device 10 does not keep the stopped state of the step-up operation.

As shown in FIG. 9, the protection function is disabled for a predetermined period (approximately 1 ms) after power-on. This helps prevent the step-up operation from being stopped as a result of conditions, such as a transient current or insufficiently stepped-up voltage, occurring at start-up of the semiconductor device 10 being erroneously detected as abnormal conditions, making the semiconductor device 10 unable to start up.

Incidentally, in a case where LED brightness is adjusted with PWM by using the PWMDRV terminal (that is, in a case where current driver dimming is adopted), an abnormal latch selection function of the FAILSEL terminal cannot be used.

In a case where LED brightness is adjusted with PWM by using the PWMPOW terminal (that is, in a case where power control dimming is adopted), and the LEDs are turned off for 10 ms or more, it is preferable to set an off period by using the RSTB terminal rather than the PWMPOW terminal. Doing so helps prevent the step-up operation from being stopped as a result of an unintended overcurrent protection operating after the above-described off period (see and compare the upper and lower portions of FIG. 10).

Next, external SBD disconnection protection and overvoltage protection will be explained.

The semiconductor device 10 incorporates a protection function portion (the SBD disconnection protection portion 105) provided for protection against a voltage that is excessively stepped up due to disconnection of an external SBD, and an overvoltage protection function portion (the OVP portion 106). These portions detect a terminal voltage of the VDET terminal (1 pin) or a voltage obtained by dividing that terminal voltage, and transmits an abnormal condition detection signal to the control portion 113 if abnormal conditions occur, so as to stop the transistor N1. A detailed description will be given below.

External SBD disconnection protection operates as follows. If connection between the DC/DC output node (the output node of the output voltage VOUT) and the diode D1 becomes open, a voltage may be excessively stepped up, resulting in a breakdown of the coil L1 or the transistor N1. Thus, if an abnormal condition in which the output voltage VOUT becomes 0.1 V or lower, for example, occurs, external SBD disconnection protection operates, turning the transistor N1 off. As a result, the coil L1 or the transistor N1 is prevented from being broken down. In addition, the semiconductor device 10 is switched from an operating state to a non-operating state, and the passage of a current through the coil L1 stops.

On the other hand, overvoltage protection operates as follows. If connection between the DC/DC output node and the load (a line of LEDs) becomes open, a voltage may be excessively stepped up, causing a voltage that exceeds the absolute maximum rating of the transistor N1 or the VDET terminal to be applied thereto, resulting in a breakdown of the transistor N1 or the semiconductor device 10. Thus, if an abnormal condition in which a voltage at the VDET terminal becomes a predetermined detection voltage Vth1 or higher, for example, occurs, overvoltage protection operates, turning the transistor N1 off. As a result, the transistor N1 or the semiconductor device 10 is prevented from being broken down. At this point, the semiconductor device 10 is switched from an operating state to a non-operating state, and the output voltage VOUT gradually drops. When the output voltage VOUT drops and becomes a predetermined detection voltage Vth2 or lower (Vth2<Vth1), the output voltage VOUT is stepped up again to the detection voltage. Thereafter, these operations are repeatedly performed until recovery from abnormal application condition is completed.

Next, thermal shutdown will be explained.

The semiconductor device 10 incorporates a thermal shutdown function portion (the TSD portion 102). Thermal shutdown operates at a temperature of 175° C. or higher, and the semiconductor device 10 is switched from an operating state to a non-operating state. In a non-operating state, unlike a case in which the RSTB terminal is at a low level, the internal settings of the semiconductor device 10 are not reset. That is, even when a thermal shutdown function operates, settings related to the RSTB terminal (soft-start function enable/disable setting, FAILSEL terminal abnormal latch selection setting, setting of the line number driven by the current driver 123, and setting of starting current when the PWMDRV terminal is at a low level) are retained.

Next, overcurrent protection will be explained.

If an overcurrent flows through the resistor RCS for overcurrent detection connected between the source of the transistor N1 and the ground, and the terminal voltage of the SENSP terminal (5 pin) becomes a detection voltage or higher, overcurrent protection operates, reducing the on-duty ratio of the transistor N1 without stopping the step-up operation. In this way, an overcurrent that is equal to or greater than a detection current is prevented. Since the current detecting portion 112 of the semiconductor device 10 detects a peak current, a current that is equal to or greater than the overcurrent set value does not flow. In addition, by changing the resistor RCS for overcurrent detection, it is possible to set any value as the overcurrent detection value.

Next, a method of deriving the resistance value of the resistor RCS will be explained.

The resistance value of the resistor RCS is calculated by dividing the overcurrent detection voltage by the overcurrent set value. In so doing, the resistance value of the resistor RCS may be derived by first determining the overcurrent set value based on a current value needed for normal operation, and then, with consideration given to variations in overcurrent detection voltage, using the smallest overcurrent detection voltage. For example, consider a case in which an ideal value of the overcurrent detection voltage is 100 mV, the smallest value thereof is 70 mV, the largest value thereof is 130 mV, and the overcurrent set value is 1 A. Then, the resistance value of the resistor RCS is 70 mΩ (=70 mV/1 A). If such a resistance value is set, the range of current variation is 1 to 1.86 A (=130 mV/70 mΩ).

Next, how to estimate a current value needed for normal operation will be explained.

Since the current detecting portion 112 of the semiconductor device 10 detects a peak current, it is necessary to estimate a peak current Ipeak flowing through the coil L1 according to the conditions under which the semiconductor device 10 is used. Here, let the power supply voltage of the coil L1 be VIN, the inductance value of the coil L1 be L, the switching frequency be fsw (the lowest value: 0.8 MHz, an ideal value: 1 MHz, and the highest value: 1.2 MHz), the output voltage be VOUT, the total LED current be IOUT, and efficiency be eff. Then, the peak current Ipeak of the coil L1, the average current Iave of the coil L1, and the switching time Ton are respectively given by formulae (1a), (1b), and (1c) below.

$$Ipeak = (VIN/L) \times (1/fsw) \times (1-(VIN/VOUT)) \quad (1a)$$

$$Iave = (VOUT \times IOUT/VIN)/\text{eff} \quad (1b)$$

$$Ton = (Iave \times (1-VIN/VOUT) \times (1/fsw) \times (L/VIN) \times 2)^{1/2} \quad (1c)$$

In addition, since a peak current detected by the current detecting portion 112 varies depending on whether a direct current is superimposed or not, a judgment is made based on formulae (2a) and (2b) below.

$$(1-VIN/VOUT) \times (1/fsw) < Ton \rightarrow \text{peak current} = Ipeak/2 + Iave \quad (2a)$$

$$(1-VIN/VOUT) \times (1/fsw) > Ton \rightarrow \text{peak current} = (VIN/L) \times Ton \quad (2b)$$

For example, let VIN be 6.0 V, L be 4.7 μH, fsw be 1 MHz, VOUT be 39 V, IOUT be 80 mA, and eff be 85%. Then, formulae (1a), (1b), and (1c) above give that Ipeak=1.08 A, Iave=0.61 A, and Ton=0.90 μs, and formula (2a) above gives that peak current=1.15 A.

On the other hand, let VIN be 12.0 V, L be 4.7 μH, fsw be 1 MHz, VOUT be 39 V, IOUT be 80 mA, and eff be 85%. Then, formulae (1a), (1b), and (1c) above give that Ipeak=1.77 A, Iave=0.31 A, and Ton=0.41 μs, and formula (2a) above gives that peak current=1.05 A.

However, setting the peak current to too large a value results in the occurrence of output overshoot. At worst, it could cause a breakdown of the semiconductor device 10. Therefore, due caution should be exercised not to set the peak current to too large a value.

Next, operation performed when an application malfunction occurs will be explained.

Consider a case in which one LED or one line of LEDs becomes open during operation. In this case, if the FAILSEL terminal is at a low level, the line of LEDs that has become open is not lit, and the remaining lines of LEDs are lit as usual. At this point, since the LED terminal voltage becomes 0 V, the output voltage VOUT is stepped up to its overvoltage protection voltage, namely 44.7 V, is stepped up until the LED terminal voltage reaches its overvoltage protection voltage, namely 11.5 V, or is stepped up until the current flowing through the LEDs is limited by an overcurrent limit. On the other hand, if the FAILSEL terminal is at a high level, once an LED becomes open, the step-up operation is stopped, and all the LEDs are turned off.

Consider a case in which a plurality of LEDs become shorted. In this case, if the FAILSEL terminal is at a low level, all the remaining LEDs are lit as usual unless the LED terminal voltage becomes its overvoltage protection voltage, namely 11.5 V, or higher; when the LED terminal voltage becomes 11.5 V or higher, only the line of LEDs containing the shorted LED is normally lit, and the other lines of LEDs become dark or are turned off due to a reduction in LED current. On the other hand, if the FAILSEL terminal is at a high level, when the LED terminal voltage becomes 11.5 V or higher, the step-up operation is stopped, and all the LEDs are turned off.

If the Schottky barrier diode D1 is in a disconnected state, all the LEDs do not light up irrespective of a voltage level of the FAILSEL terminal. In addition, since the step-up operation is stopped with the SBD disconnection protection function, the semiconductor device 10 and the transistor N1 are prevented from being broken down.

If the resistor RCS for overcurrent detection is in a disconnected state, all the LEDs do not light up irrespective of a voltage level of the FAILSEL terminal. The reason is that, due to the presence of a resistor of 100 kΩ placed between the SENSP terminal and the SENSN terminal, disconnection of the resistor RCS quickly causes overcurrent protection to operate, making it impossible to pass the LED current.

Next, with reference to FIG. 11, timing with which control signals (an RSTB signal, a PWMPOW signal, and a PWMDRV signal) are inputted will be explained.

Figure 11:
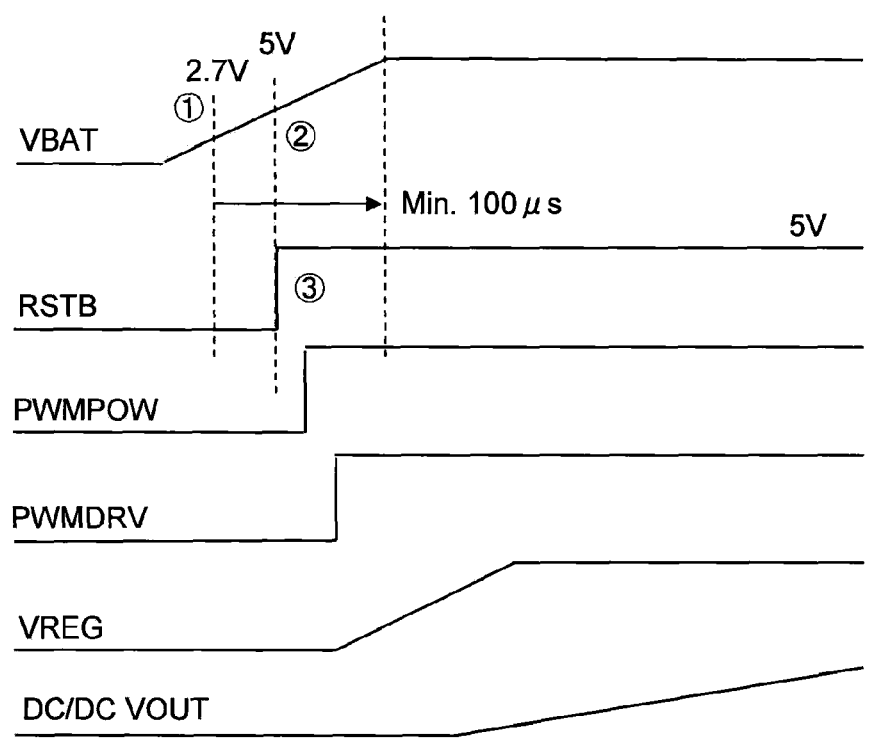
FIG. 11 is a timing chart of control signals.

FIG. 11 is a timing chart of control signals.

When control signals such as an RSTB signal, a PWMPOW signal, and a PWMDRV signal are inputted before the power supply voltage VBAT has completely risen, there are a few things that have to be kept in mind.

Firstly, it is preferable that the control signals be inputted after the power supply voltage VBAT exceeds 2.7 V.

Secondly, it is preferable that the control signals be inputted after the power supply voltage VBAT exceeds the high level voltage (5 V) of the control signals.

Thirdly, it is preferable that, in a case where a high level voltage is inputted as the RSTB signal and the PWMPOW signal while the power supply voltage VBAT is rising, the time that the power supply voltage VBAT takes to rise from 2.7 V to a stable voltage be set to a minimum of 100 μs.

It is to be noted that no limit is placed on the timing with which the control signals such as the RSTB signal, the PWMPOW signal, and the PWMDRV signal are inputted.

Figure 12:
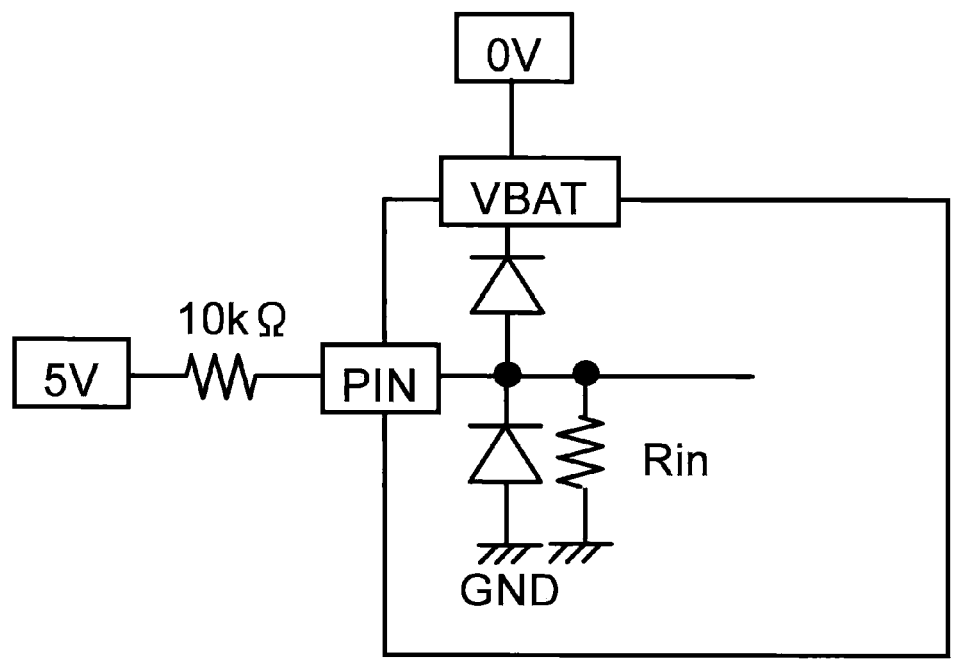
FIG. 12 is a diagram illustrating a current limit imposed on the control signal line.

In addition, if the voltage level of the control signals becomes higher than the power supply voltage VBAT, an unintended current may flow through a static protection diode internally connected to each terminal, the static protection diode being provided on the power supply voltage VBAT side, toward a supply line of the power supply voltage VBAT, causing a malfunction or a breakdown of the element. To avoid such a problem, as shown in FIG. 12, it is preferable to impose a current limit by inserting a resistor of the order of 10 kΩ in the signal line. Furthermore, as shown in FIG. 1, it is preferable that the internal pull-down resistors be appropriately provided one for each of the terminals.

Next, how to select the number of lines driven by the current driver 123 will be explained.

To reduce the number of lines driven by the current driver 123, any unnecessary terminal of the LED1 terminal to the LED6 terminal is connected to the ground, such that that unnecessary terminal is deselected. Thus, it is possible to deal with a case in which four lines, for example, are used by connecting unnecessary two lines to the ground.

Incidentally, in the semiconductor device 10 of this embodiment, as a power source of the LED terminal detecting portion 116 that makes a judgment on the above-described result, the terminal voltage (5 V) of the RSTB terminal is used. With this configuration, even if power control dimming is adopted, and on/off control is performed on the operation of the REG portion 101, the LED terminal detecting portion 116 can retain the LED terminal detection result by using the terminal voltage of the RSTB terminal.

The LED terminal selection result is judged regardless of the logic of the PWMPOW signal and the PWMDRV signal, and, once a terminal is judged to be a necessary terminal, that terminal is not judged to be an unnecessary LED terminal even when it is connected to the ground. However, this information can be reset by making the RSTB terminal equal to 0 V. Incidentally, connecting an unnecessary LED terminal to the ground results in an increase in a power source current flowing into the RSTB terminal. It is for this reason that particular attention should be paid to a current capacity connected to the RSTB terminal. FIG. 13 is a table showing examples of consumption current when RSTV=5 V. An example of this application is shown in FIG. 5 described above.

Next, with reference to FIG. 14, start-up control and a selection of LED current will be explained.

The semiconductor device 10 can control the power to the semiconductor device 10 by using the RSTB terminal, and can forcedly turn off the power to the semiconductor device 10 by reducing the voltage at the RSTB terminal to 0.2 V or below (RSTB="0"). When the voltage at the PWMPOW terminal is 1.4 V or above (PWMPOW="1") and the voltage at the RSTB terminal is 2.25 V or above (RSTB="1"), the semiconductor device 10 is in a power-on state.

When RSTB=PWMPOW="1", if PWMDRV="1", the first current ISETH is selected as an LED current ILED; if PWMDRV="0", the second current ISETL is selected as the LED current ILED. Incidentally, the starting current flowing when PWMDRV="0" is turned off at the second rise of PWMDRV, and is then set to 0 mA. By turning RSTB to a low level and then turning it to a high level, it is possible to pass the starting current again.

That is, in a case where current driver dimming is adopted as an LED brightness dimming method, "0"/"1" levels are given to the PWMDRV terminal for driving while continuously giving "1" level to the PWMPOW terminal; in a case where power control dimming is adopted, "0"/"1" levels are given to the PWMPOW terminal for driving while continuously giving "1" level to the PWMDRV terminal.

Next, start-up operation and PWM operation performed when the PWMPOW terminal is used for PWM control of LED brightness (that is, when power control dimming is adopted) will be explained.

In a case where the PWMPOW terminal is used for PWM control of LED brightness, it is simply necessary to input a PWM-driven pulse voltage to the PWMPOW terminal after turning the RSTB terminal and the PWMDRV terminal from a low level to a high level. There are no restrictions on the order in which the voltage is applied to the RSTB terminal and the PWMDRV terminal.

To deal with a case in which a pulse voltage is PWM driven with an on period shorter than a soft-start period (1 ms), if a high level is inputted to the PWMPOW terminal three times or more, the soft-start function is disabled so as to make high-speed driving possible. Once the soft-start function is disabled, the disabled state of the soft-start function will persist until the RSTB terminal is turned to a low level.

Figure 15:
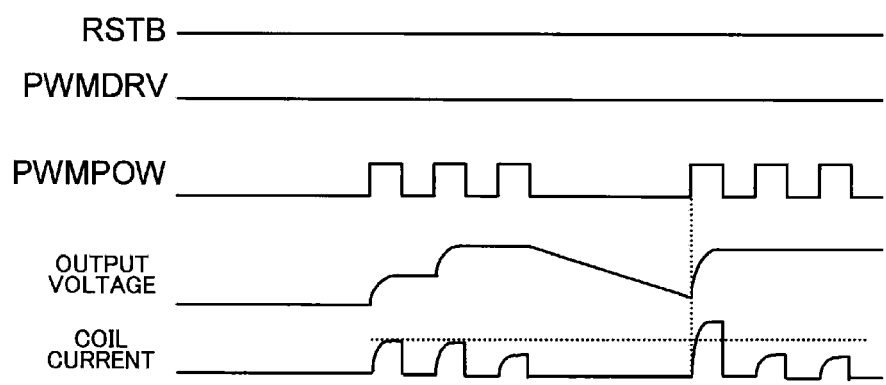
FIG. 15 is a timing chart showing a state in which lights-out control is performed by turning the PWMPOW terminal to a low level at the time of PWM control with the PWMPOW terminal.

As a result, in a case where the LEDs are controlled by using the PWMPOW terminal such that, for example, they are turned on, turned off, and then turned on again, the control is performed as follows. After the LEDs are turned off by turning the PWMPOW terminal to a low level, they are turned on by turning the PWMPOW terminal to a high level. In so doing, the semiconductor device 10 is turned on without soft-start. This may result in variations in the peak current Ipeak of the coil L1 due to the discharge of the output capacitor C2, leading to an increase in the peak current Ipeak up to an overcurrent limit value, as shown in FIG. 15.

Figure 16:
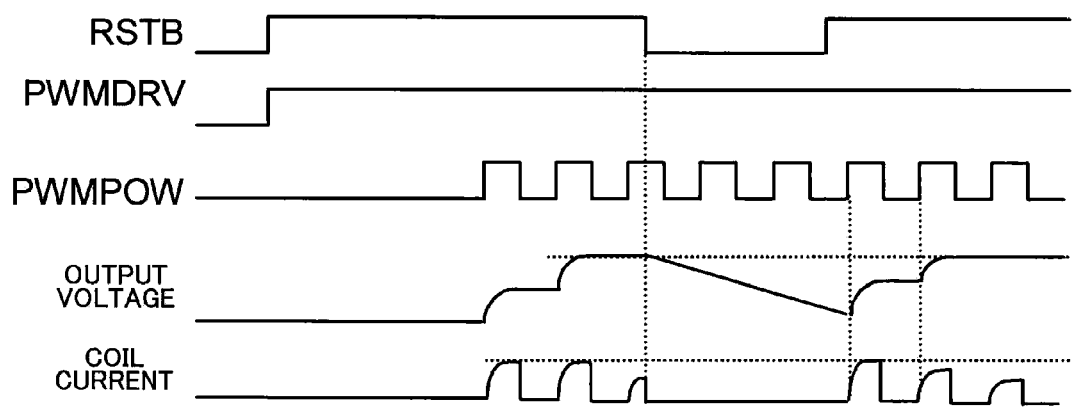
FIG. 16 is a timing chart showing a state in which lights-out control is performed by turning the RSTB terminal to a low level at the time of PWM control with the PWMPOW terminal.

By contrast, as shown in FIG. 16, in a case where the LEDs are turned off by turning the RSTB terminal to a low level, the soft-start function is enabled again as a result of the RSTB terminal being turned to a low level, making it possible to control the peak current Ipeak of the coil L1. Thus, when turning off the LEDs, it is preferable to set an off period not by using the PWMPOW terminal but by using the RSTB terminal.

Next, start-up operation and PWM operation performed when the PWMDRV terminal is used for PWM control of LED brightness (that is, when current driver dimming is adopted) will be explained.

In a case where the PWMDRV terminal is used for PWM control of LED brightness, it is simply necessary to input a PWM-driven pulse voltage to the PWMDRV terminal after turning the RSTB terminal and the PWMPOW terminal from a low level to a high level. There are no restrictions on the order in which the voltage is applied to the RSTB terminal and the PWMPOW terminal.

Figure 17:
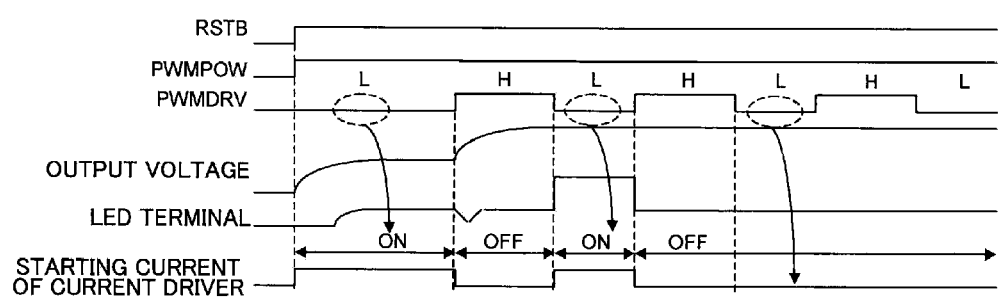
FIG. 17 is a timing chart showing the timing with which the starting current is turned off.

As shown in FIG. 17, after the RSTB terminal and the PWMPOW terminal are turned from a low level to a high level, it could be that a low level voltage, not a pulse voltage, is inputted to the PWMDRV terminal. In such a case, if the current driver 123 is so configured as to draw no LED current ILED during a low level period of the PWMDRV terminal, the DC/DC converter cannot perform a stable step-up operation.

To avoid such a problem, as shown in FIG. 17, in the semiconductor device 10 of this embodiment, a predetermined starting current is drawn from each LED terminal at start-up of the semiconductor device 10 during a low level period of the PWMDRV terminal, so as to achieve a stable step-up operation. The value of the starting current can be set to any value with the resistance value (RISETL) of a resistor connected to the ISETL terminal. As a result, at start-up of the semiconductor device 10, the LED current ILED is driven with PWM between the first current ISETH (for example, 20 mA) set by the first current setting portion 118 and the second current ISETL (for example, 100 μA) set by the second current setting portion 119.

On the other hand, after the semiconductor device 10 is started normally, the above-described starting current is no longer required for adjusting the LED brightness with PWM. Thus, as shown in FIG. 17, the starting current is automatically set to 0 mA at the second rise of the PWMDRV terminal. Thus, at the time of normal operation of the semiconductor device 10, the LED current ILED is driven with PWM between the first current ISETH (for example, 20 mA) set by the first current setting portion 118 and 0 mA.

Incidentally, only the behavior of the starting current in the current driver 123 is shown in the bottom line of FIG. 17.

Figure 18:
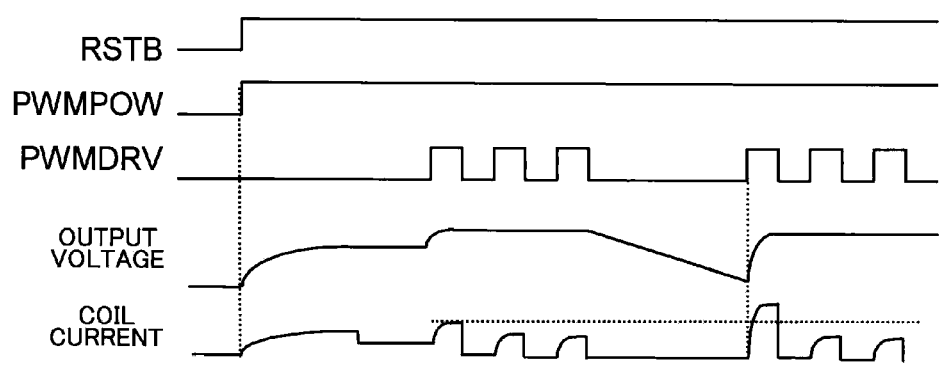
FIG. 18 is a timing chart showing a state in which lights-out control is performed by turning the PWMDRV terminal to a low level at the time of PWM control with the PWMDRV terminal.

In a case where the LEDs are controlled by using the PWMDRV terminal such that, for example, they are turned on, turned off, and then turned on again, the control is performed as follows. After the LEDs are turned off by turning the PWMDRV terminal to a low level, they are turned on by turning the PWMDRV terminal to a high level. In so doing, the semiconductor device 10 is turned on without soft-start because the soft-start period has been terminated. This may result in variations in the peak current Ipeak of the coil L1 due to the discharge of the output capacitor C2, leading to an increase in the peak current Ipeak up to an overcurrent limit value, as shown in FIG. 18.

Figure 19:
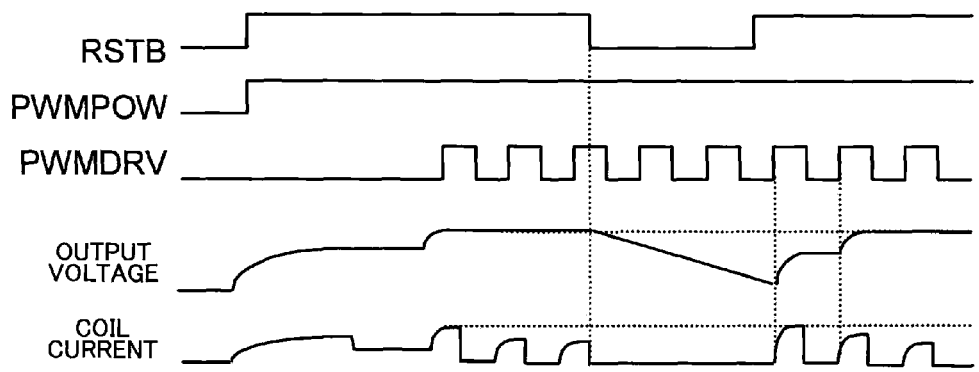
FIG. 19 is a timing chart showing a state in which lights-out control is performed by turning the RSTB terminal to a low level at the time of PWM control with the PWMDRV terminal.

By contrast, as shown in FIG. 19, in a case where the LEDs are turned off by turning the RSTB terminal to a low level, the soft-start function is enabled again as a result of the RSTB terminal being turned to a low level, making it possible to control the peak current Ipeak of the coil L1. Thus, when turning off the LEDs, it is preferable to set an off period not by using the PWMDRV terminal but by using the RSTB terminal.

Next, the setting range of the LED current ILED will be explained.

For the LED current ILED, a normal current and a starting current can be set individually. The normal current is set by a resistor (RISETH) connected to the ISETH terminal (9 pin), and the starting current is set by a resistor (RISETL) connected to the ISETL terminal (10 pin). The normal current and the starting current are respectively given by formulae (3a) and (3b) below.

$$\text{normal current}=480/\text{RISETH} \tag{3a}$$

$$\text{starting current}=0.6/\text{RISETL} \tag{3b}$$

The normal current is set within a range of 10 to 25 mA, and the starting current is turned off or is set within a range of 1 to 100 μA. The starting current can be turned off by connecting the ISETL terminal to the VREG terminal. When the starting current is turned off, the LED current ILED consists only of a leakage current (up to 1 μA).

Next, LED brightness control will be explained.

The LED brightness can be adjusted with PWM by applying a PWM pulse voltage to the PWMPOW terminal or the PWMDRV terminal. That is, as a method for PWM adjustment of the LED brightness, the semiconductor device 10 of this embodiment can use two techniques. Of these two techniques, one is PWM dimming (the above-described current driver dimming) by which the LED brightness is adjusted by performing on/off control of the LED current ILED with the current driver 12, and the other is PWM dimming (the above-described power control dimming) by which the LED brightness is adjusted by performing on/off control of different parts of the semiconductor device 10. The features of these two types of PWM dimming are shown in FIG. 20. Either of the two PWM adjustment methods may be chosen in accordance with the intended use. For example, if priority is given to efficiency at low brightness, which influences the life of battery, power control dimming may be adopted. On the other hand, if priority is given to reduction in LED current variations at the time of PWM brightness adjustment, current driver dimming may be adopted.

As shown in the above-described FIGS. 4 and 5, current driver dimming is achieved by feeding a PWM signal to the PWMDRV terminal. During a high level interval of the PWMDRV terminal, the first current ISETH set at the ISETH terminal is selected as the LED current ILED; during a low level interval, the LED current ILED is turned off. That is, the average value of the LED current ILED increases proportionately with the duty ratio of the PWM signal fed to the PWMDRV terminal.

With this PWM dimming, since the current is controlled with the current driver 123, it exhibits little variation at the time of PWM brightness adjustment, making it possible to adjust the brightness to an on-period of minimum of 50 μs (a minimum duty of 1% when the PWM frequency is 200 Hz). For an on period of less than 50 μs and an off period of less than 50 μs, the influence thereof at the time of current switching is so great that it is preferable not to use them for LED brightness adjustment. Incidentally, a normal PWM frequency is from 100 Hz to 10 kHz. In addition, as mentioned earlier, when the RSTB terminal is turned from a high level to a low level, the starting current is enabled. As a result, after the RSTB terminal is turned from a low level to a high level until the second rise of the PWM signal, the LED current ILED is driven with PWM between the first current ISETH and the starting current (second current ISETL).

On the other hand, as shown in the above-described FIGS. 6 and 7, power control dimming is achieved by feeding a PWM signal to the PWMPOW terminal. During a high level interval of the PWMPOW terminal, a current selected by the logic of the PWMDRV terminal is set as the LED current ILED; during a low level interval, the LED current ILED is turned off. That is, the average value of the LED current ILED increases proportionately with the duty ratio of the PWM signal fed to the PWMPOW terminal.

With this PWM dimming, it is possible to turn off the power to the semiconductor device 10 when the LEDs are turned off. This helps reduce the consumption current and increase efficiency, and makes it possible to adjust the brightness to an on-period of minimum of 50 μs (a minimum duty of 1% when the PWM frequency is 200 Hz). For an on period of less than 50 μs and an off period of less than 50 μs, the influence thereof at the time of power on/off is so great that it is preferable not to use them for LED brightness adjustment. Incidentally, a normal PWM frequency is from 100 Hz to 1 kHz. In addition, it is impossible to perform PWM control for the RSTB terminal and the PWMPOW terminal at the same time. It is simply necessary to perform PWM control by using only the PWMPOW terminal after setting the RSTB terminal to a high level.

In either of the current driver dimming and power control dimming described above, it is preferable that the current value of the normal current set by the resistor RISETH be set to a current value (for example, 20 mA; hereinafter acceptable limit current value) at which variations in LED brightness are guaranteed to be within the acceptable limits. With this configuration, a current region in which variations in LED brightness are not guaranteed to be within the acceptable limits is not used. This eliminates the need for taking LED brightness variations into consideration when adjusting the LED brightness to 1% of maximum brightness, thus eliminating the need for screening of LEDs.

Next, separation of the IC power source and the coil power source will be explained.

Figure 21:
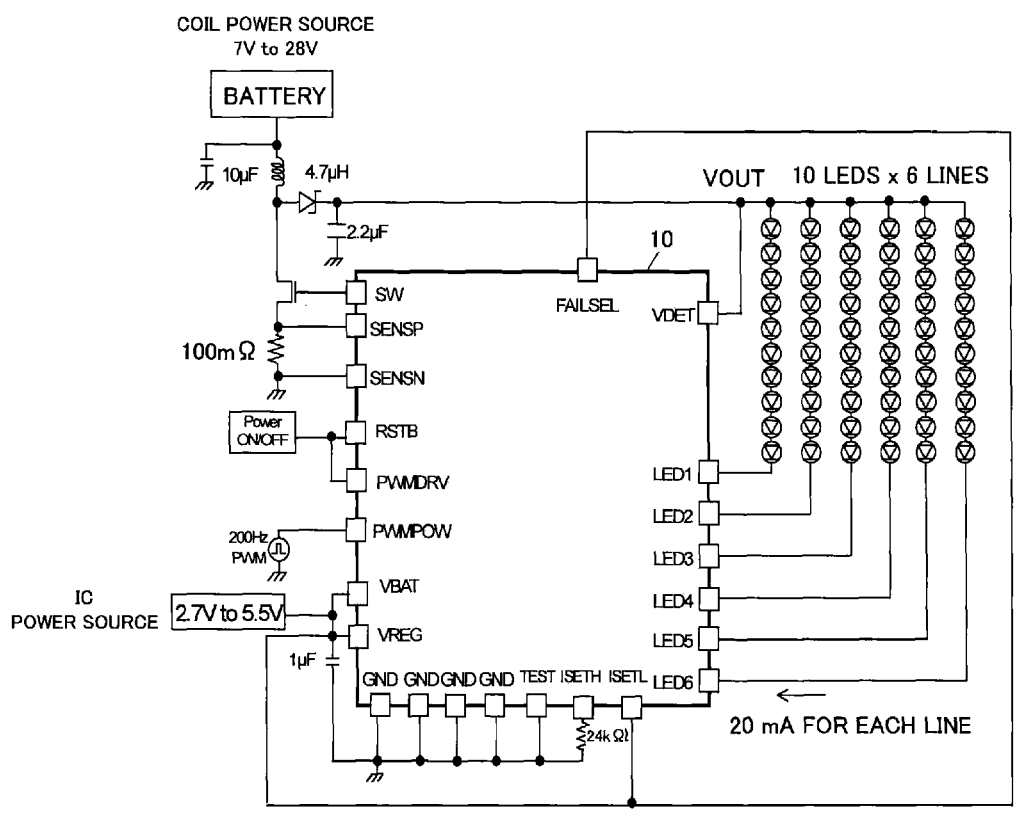
FIG. 21 is a diagram showing an application in which separate power sources are used.

The semiconductor device 10 can operate by using separate power sources: a power source for the internal circuits and a coil power source. These power sources are used, for example, to reduce power consumption of the semiconductor device 10 and to apply a voltage exceeding 22 V which is the voltage rating of the semiconductor device 10. FIG. 21 shows such an application. To the coil power source, a high-voltage source (7 to 28 V) fed from an adapter or the like is connected. Then, as a power source for the semiconductor device 10, a power source that is different from the coil power source is connected. In a case where a voltage of 2.7 to 5.5 V is inputted to the VBAT terminal of the semiconductor device 10, it is simply necessary to use the VBAT terminal and the VREG terminal with these terminals shorted outside the semiconductor device 10, as shown in FIG. 21. If the power source for the semiconductor device 10 is 0 V while the coil power source is applied, this produces no problem in use. The reason is as follows. Even if the power source for the semiconductor device 10 is 0 V, a path of leakage current from the coil power source is blocked due to the presence of a pull-down resistor for power off that is disposed inside the semiconductor device 10 for blocking the leakage current path. Incidentally, the coil power source and the power source for the semiconductor device 10 may be turned on in any order.

Next, with reference to FIGS. 22 to 24, a layout pattern of the semiconductor device 10 will be explained.

Figure 22:
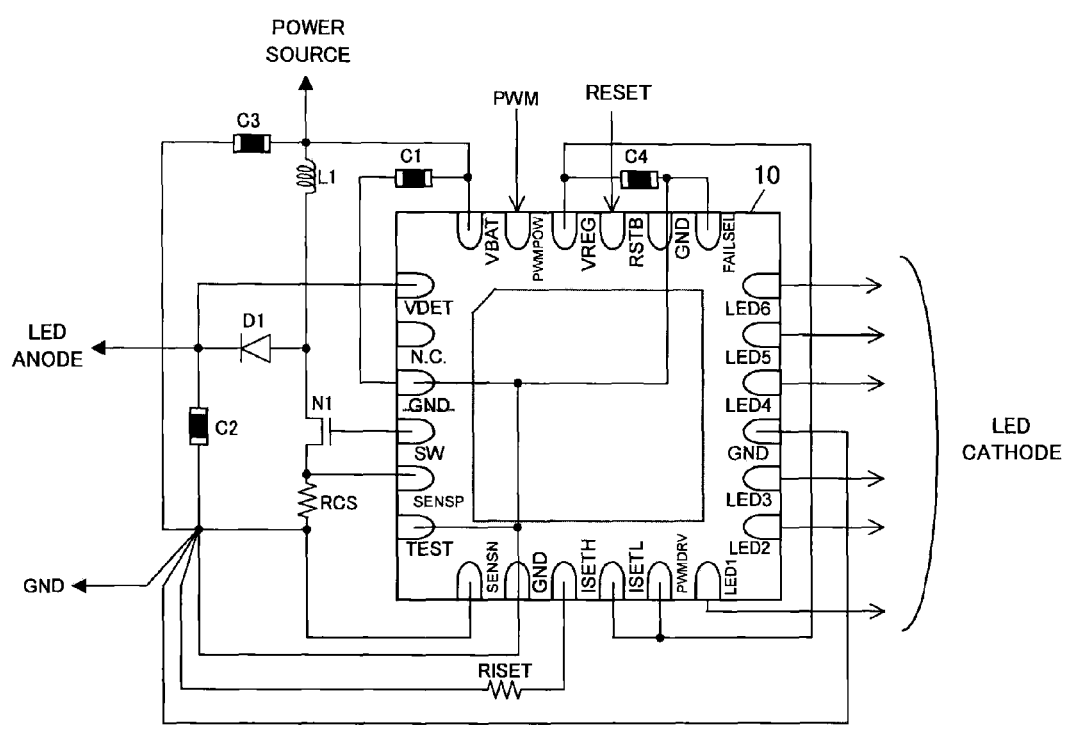
FIG. 22 is a diagram showing the layout of the semiconductor device 10.
Figure 23:
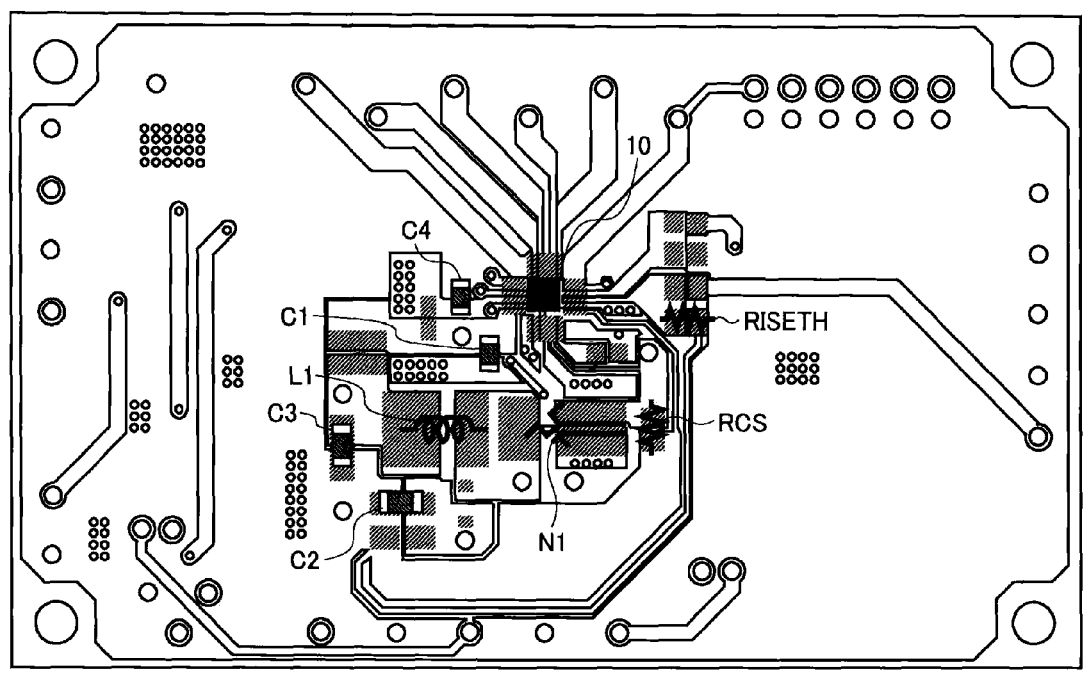
FIG. 23 is a diagram showing an example of the actual layout pattern (front face)
Figure 24:
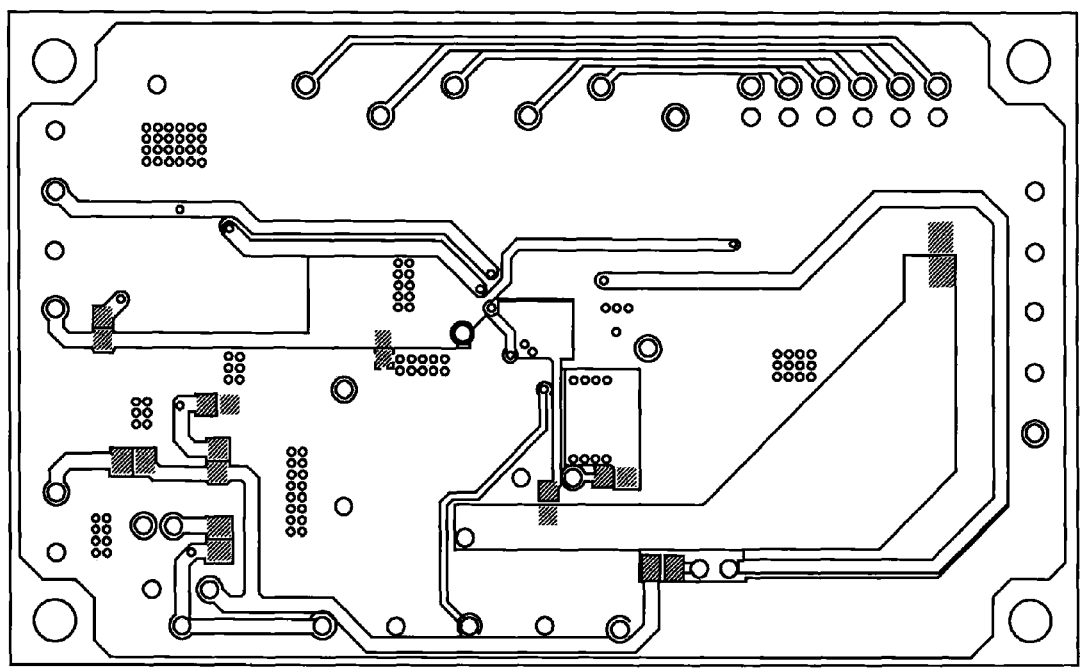
FIG. 24 is a diagram showing an example of the actual layout pattern (back face)

FIG. 22 is a diagram showing the layout of the semiconductor device 10, and FIGS. 23 and 24 are each a diagram showing an example of the actual layout pattern. It is to be noted that FIG. 23 shows a layout pattern on the front face of the substrate, and FIG. 24 shows a layout pattern on the back face of the substrate. In FIG. 24, the layout pattern on the back face of the substrate is seen through from the front face.

The layout pattern is of crucial importance in making full use of the capability of the semiconductor device 10. Particular attention should be paid to the layout pattern, because characteristics such as efficiency and ripple vary greatly depending on the layout pattern.

It is preferable that an input bypass capacitor C3 be connected as close as possible to the coil L1, and that a power supply line be laid with a low resistance from the input bypass capacitor C3 to the VBAT terminal. This layout makes it possible to reduce input voltage ripple of the semiconductor device 10.

It is preferable that a smoothing capacitor C4 of the REG portion 101 be connected between the VREG terminal and the GND terminal as close as possible to them, that the diode D1 be connected between the coil L1 and the transistor N1 as close as possible to them, and that the output capacitor C2 be connected between the cathode of the diode D1 and one end (on the GND side) of the input bypass capacitor C3 as close as possible to them. This layout makes it possible to reduce output voltage ripple.

In particular, it is preferable that top priority be assigned to making shorter a distance between the coil L1 to which a pulse waveform is applied and the diode D1 (or a distance between the coil L1 and the transistor N1) in performing layout. That is, it is preferable that connection be performed such that a distance between the coil L1 and the diode D1 is made shorter than a distance between the diode D1 and the output capacitor C2. In a case where the semiconductor device 10 incorporates the diode D1 and the transistor N1, a node at which the anode of the diode D1 and the drain of the transistor N1 are connected together and the cathode of the diode D1 are pulled out as first and second external terminals, respectively. In this case, it is preferable that connection be performed such that a distance between the coil L1 and the first external terminal is made shorter than a distance between the second external terminal and the output capacitor C2.

It is preferable that the transistor N1 be connected as close as possible to the SW terminal, and that the coil L1, the transistor N1, and the resistor RCS be laid as close as possible to one another and with a conductor having a low resistance. It is also preferable that a conductor to the SENSP terminal be connected not from the side of the transistor N1 but from the side of the resistor RCS. This is because connecting a conductor to the SENSP terminal from the side of the transistor N1 may cause a reduction in overcurrent value.

It is preferable that one end (on the GND side) of the resistor RCS be singly connected to the SENSN terminal. The resistor RCS should not be connected to the ground from a point between the resistor RCS and the SENSN terminal. In addition, it is preferable that the GND conductor be singly connected to one end (on the GND side) of the capacitor C2. This is because connecting other elements to the one end (on the GND side) of the capacitor C2 may limit a current drive capability due to the influence of noise.

It is preferable that the resistor RISETH for LED current setting be connected to the ISETH terminal as close as possible thereto. In so doing, due caution should be exercised not to attach capacitance to the ISETH terminal because this may cause oscillation. In addition, it is preferable that one end (on the GND side) of the resistor RISETH be singly connected to the ground.

If the pins of the semiconductor device 10 are not connected to their corresponding elements as close as possible to the semiconductor device 10, the capability of the semiconductor device 10 may be affected, resulting in a limited current drive capability. It is also preferable to minimize the resistance component of a conductor to the coil L1 in order to reduce power consumption and enhance overall efficiency.

Figure 25:
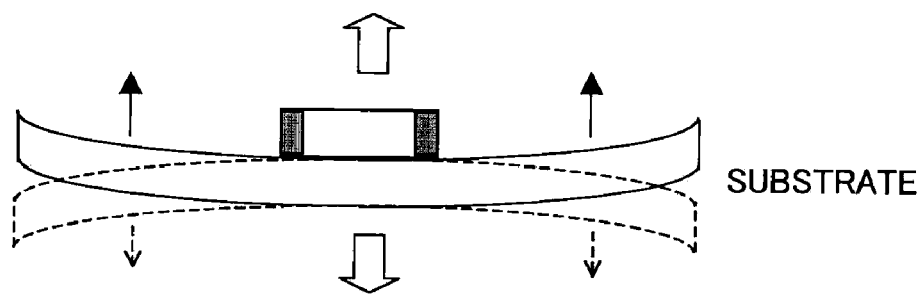
FIG. 25 is a schematic diagram illustrating how the sound attributable to the output capacitor C2 is produced.
Figure 26:
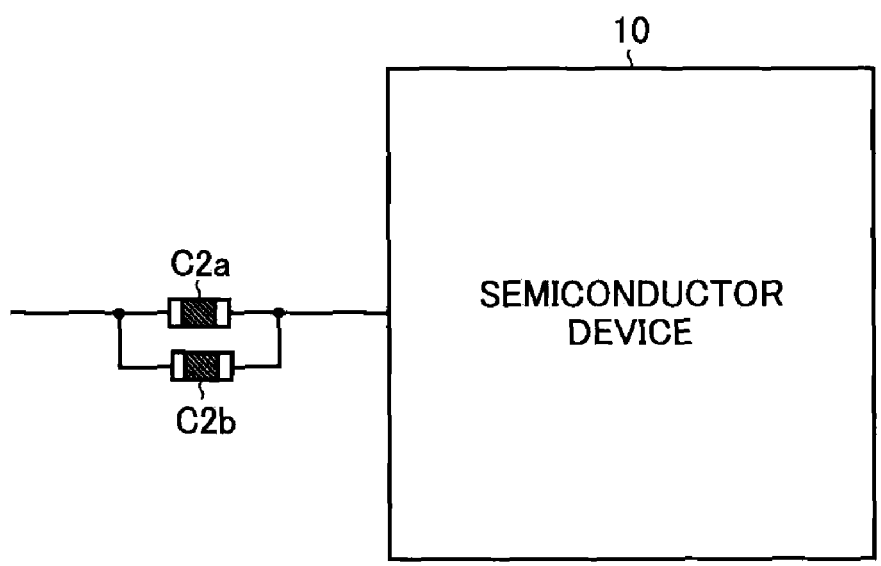
FIG. 26 is a diagram showing an example of how the output capacitor C2 is disposed.
Figure 27:
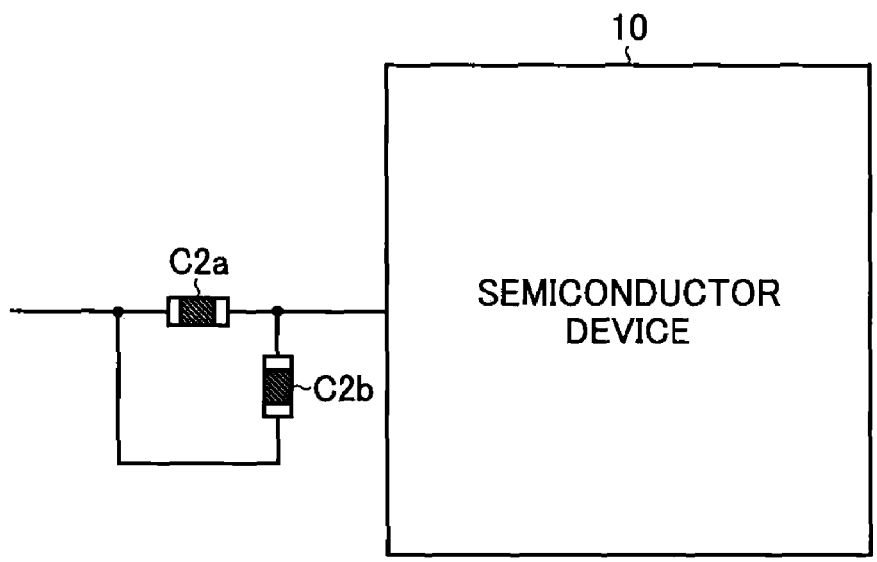
FIG. 27 is a diagram showing another example of how the output capacitor C2 is disposed.

In a case where the voltage supplied to the output capacitor C2 varies, a sound may be produced as a result of the substrate moving up and down with expansion and contraction of the element, as shown in FIG. 25. In particular, if the output capacitor C2 has a large capacitance value, the element increases in size, allowing a sound to be easily produced. To prevent this sound, it is preferable to minimize the element size of the output capacitor C2. For example, minimization of element size may be achieved by using capacitors C2a and C2b, each having half the desired capacitance value, arranged in parallel, as shown in FIG. 26. However, arranging the capacitors C2a and C2b so as to face in the same direction as shown in FIG. 26 may cause them to vibrate sympathetically, and encourages a sound to be produced. Thus, as shown in FIG. 27, the capacitors C2a and C2b are arranged so as to face in different directions. This makes it possible to prevent them from vibrating sympathetically, thereby preventing a sound from being produced. Alternatively, as shown in FIG. 28, it is also possible to prevent a sound from being produced by disposing the capacitor C2a on the front face of the substrate, and disposing the capacitor C2b on the back face of the substrate.

The above-described configuration is particularly effective when the drive frequency of the PWM signal is in the audible frequency range (in general, from 20 Hz to 20 kHz).

In addition, the above-described configuration is effective at preventing a sound from being produced not only in the output capacitor C2 but also in the input bypass capacitors C1 and C3.

Next, with reference to FIG. 29, the internal configuration of the REG portion 101 will be explained.

Figure 29:
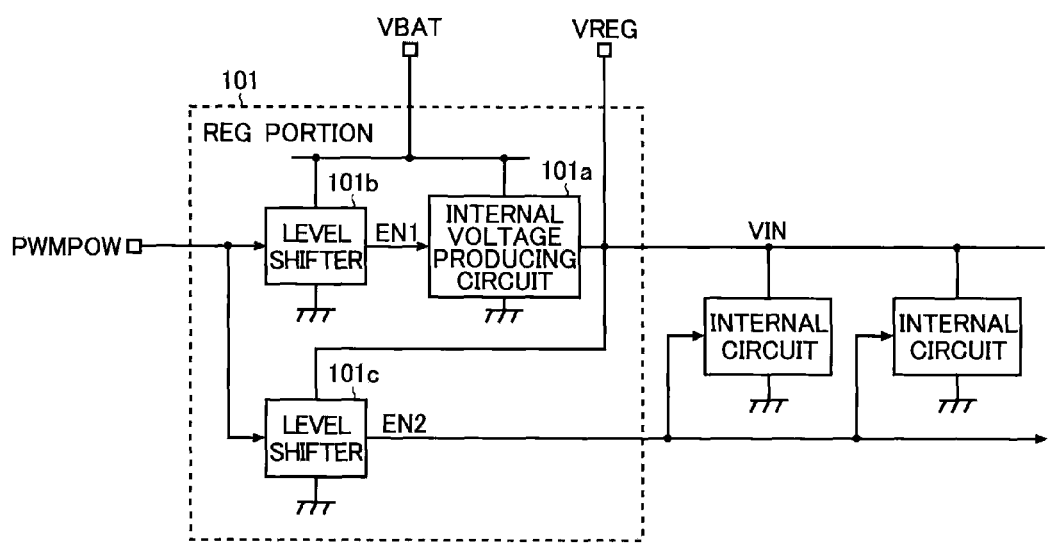
FIG. 29 is a block diagram showing the internal configuration of the REG portion 101.

FIG. 29 is a block diagram showing the internal configuration of the REG portion 101.

As shown in this figure, the REG portion 101 includes, in addition to an internal voltage producing circuit 101a producing an internal voltage VIN, a first level shifter 101b and a second level shifter 101c.

The first level shifter 101b receives the terminal voltage (coil power source) of the VBAT terminal, and produces a first enable signal EN1 (0 to 20 V) for performing on/off control of the internal voltage producing circuit 101a by shifting the level of the PWM signal (0 to 1.4 V) inputted from the PWM-POW terminal.

The second level shifter 101c receives the terminal voltage (IC power source) of the VREG terminal, and produces a second enable signal EN2 (0 to 5 V) for performing on/off control of the internal circuits (different circuits other than the REG portion 101) by shifting the level of the PWM signal inputted from the PWMPOW terminal.

Since the semiconductor device 10 of this embodiment incorporates the REG portion 101 configured as described above, regardless of whether or not the coil power source and the IC power source are separated from each other, it is possible to achieve the above-described power control dimming based on the PWM signal inputted from the PWMPOW terminal.

Next, an advantage in using a white LED as a backlight of a liquid crystal display incorporated in a notebook-size personal computer will be explained.

The first advantage is that, unlike the cold cathode fluorescent lamp (CCFL), the while LED is a surface-mount chip, making it possible to achieve a thinner and more lightweight panel having a higher resistance to vibration and impact. The second advantage is that the white LED has a wide brightness adjustment range, making it possible to achieve battery saving by reducing the brightness in low light. The third advantage is that the white LED is free from Hg, making it possible to bring products into compliance with the RoHS Directive. The fourth advantage is that there is no need to use a high voltage of 1000 Vrms, making it easy to meet safety standards.

Figure 30:
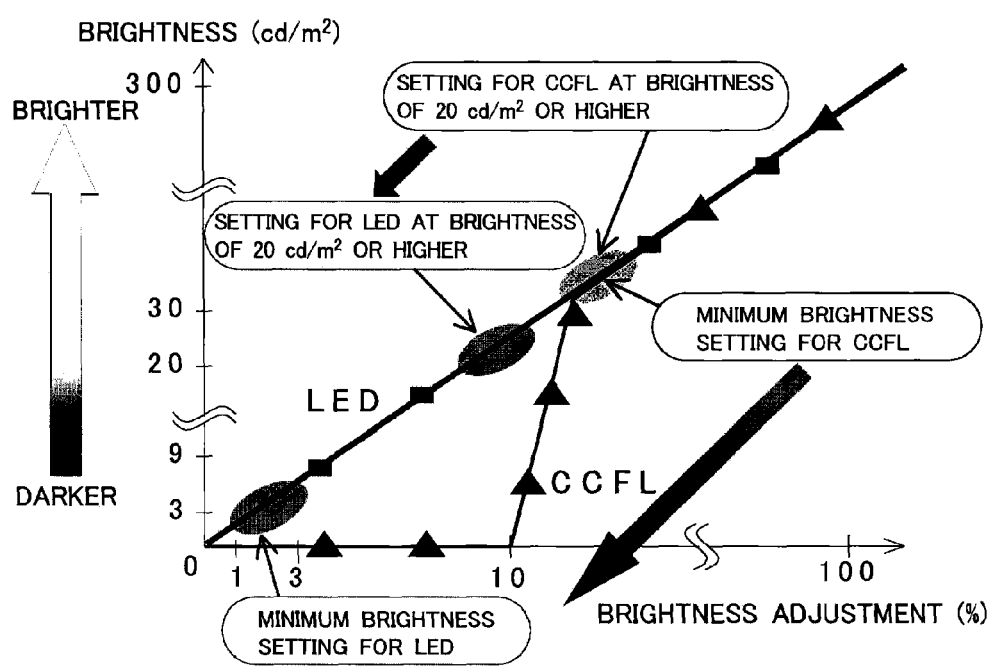
FIG. 30 is a diagram for comparison between the brightness adjustment characteristics of LEDs and the brightness adjustment characteristics of the cold cathode fluorescent lamps (CCFLs)

As the LEDs have come to be increasingly used as the backlight, the LED drivers that drive the LEDs are required to have a longer battery life or to reduce power consumption by reducing the brightness of the screen. To satisfy this requirement, the LED drivers having the capability of adjusting the brightness to a low of 1% of the maximum brightness, a level at which an image on the panel is barely visible, are sought after. Incidentally, due to its characteristics, with the cold cathode fluorescent lamp (CCFL), it is difficult to adjust the brightness to 10% or less (see a comparison of LED marked with squares and CCFL marked with triangles in FIG. 30).

It is for this reason that the semiconductor device 10 of this embodiment is so configured as to adjust the brightness to a low of 1%, and, in addition, to achieve high efficiency even at low brightness. Hereinafter, this configuration will be explained in detail.

Figure 31:
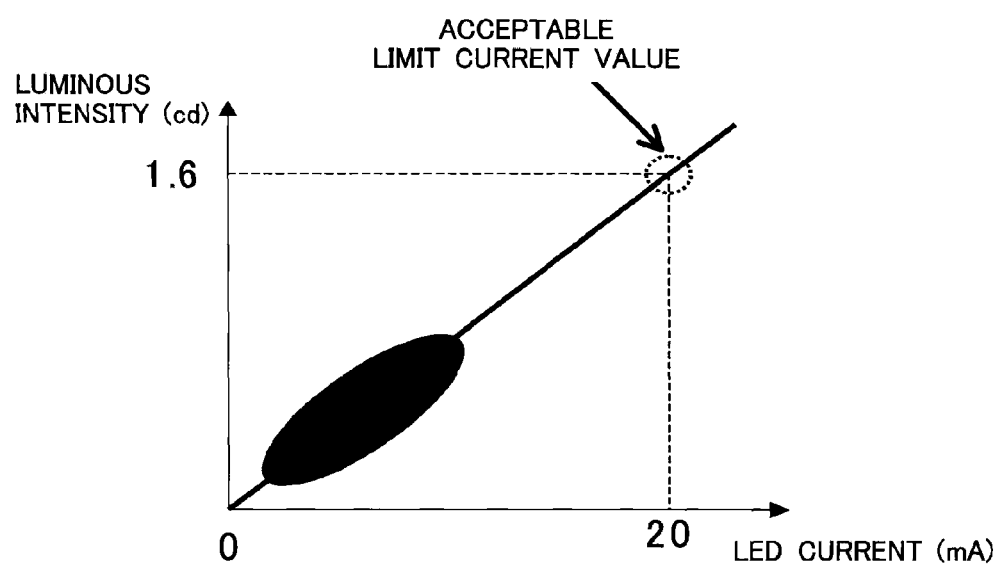
FIG. 31 is a diagram showing an example of the brightness characteristics of LEDs.

First, an LED drive method to be adopted to achieve these purposes will be discussed. In so doing, a problem to be solved is how to deal with variations in LED brightness. As shown in FIG. 31, since variations in LED brightness are guaranteed to be within the acceptable limits in the current range from an acceptable limit current value (for example, 20 mA) and above, brightness variations are not visible. However, if the current is reduced below the acceptable limit current value, variations in LED brightness are not guaranteed to be within the acceptable limits, making brightness variations visible. Thus, the LEDs have to be driven at the acceptable limit current value.

Figure 32:
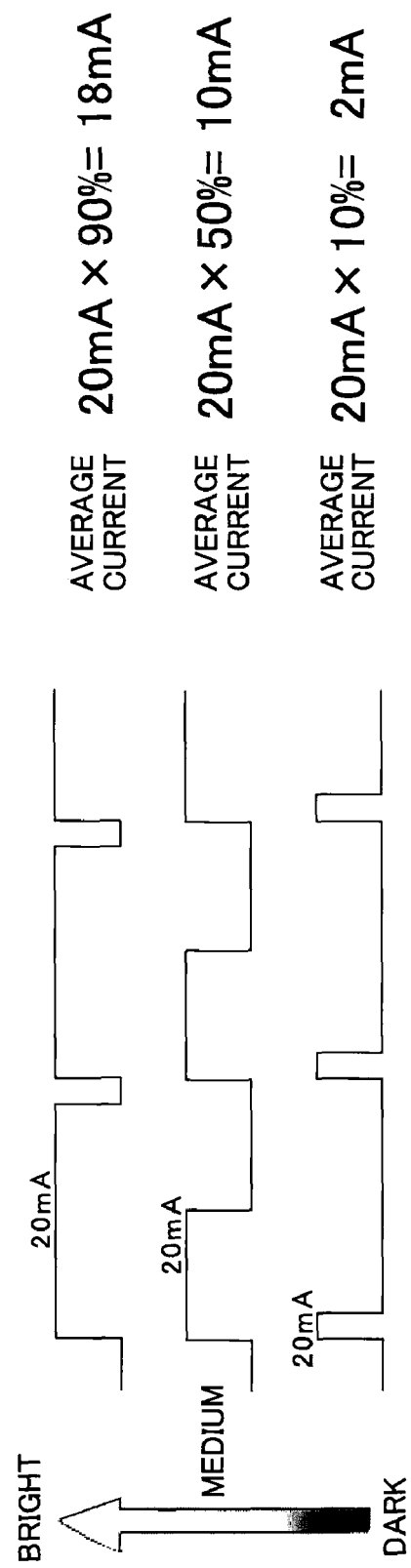
FIG. 32 is a diagram showing an example of PWM brightness adjustment.

Thus, as shown in FIG. 32, the semiconductor device 10 of this embodiment is so configured as to make an adjustment (PWM brightness adjustment) to an average current based on the ratio between an on period (acceptable limit current value: 20 mA) and an off period (0 mA) of the LED. With this configuration, a current region below the acceptable limit current value is not used. This eliminates the need for screening of LEDs.

Figure 33:
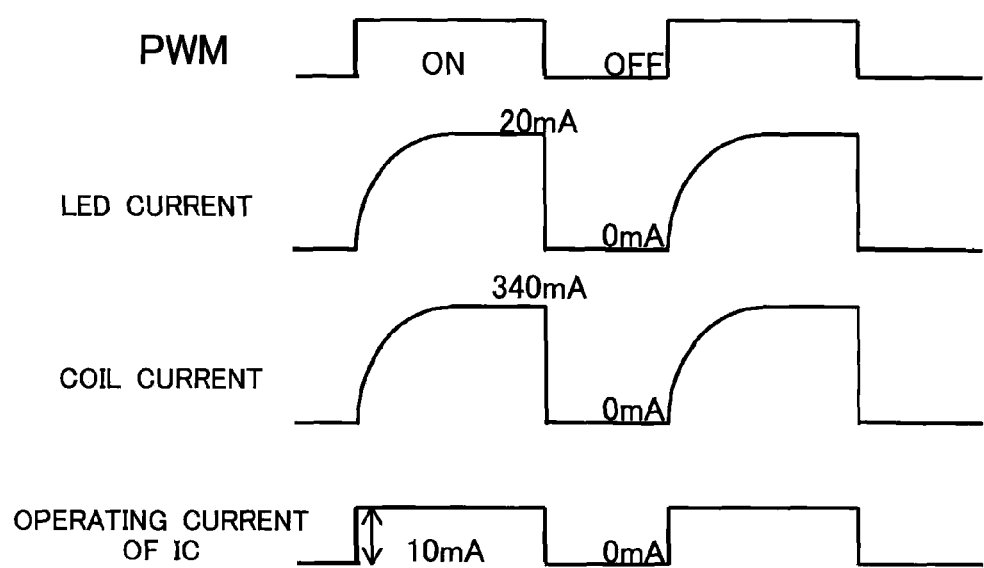
FIG. 33 is a diagram illustrating a problem related to PWM brightness adjustment.

Next, a problem to be solved in adjusting the brightness to 1% with PWM will be discussed. In an LED driver IC for cellular phones, in a case where LED brightness is adjusted with PWM by power control dimming, as shown in FIG. 33, to reduce the peak current of the battery at start-up, the soft-start function suppresses high-speed start-up (for example, such that a start-up time is 300 μs, which corresponds to a brightness of 6%) which would cause an increase in the peak current, every time the PWM signal is turned on. In addition, the LED current rises in the same amount of rise time every time the PWM signal is turned on, and is set such that the start-up time of the current driver is longer than the response time of the DC/DC converter (for example, a response time of 150 μs, which corresponds to a brightness of 3%).

As just described, the start-up time (300 μs) controlled by the soft-start function and the response time (150 μs) of the DC/DC converter are stumbling blocks to achieving an LED current start-up time of 50 μs (corresponding to a brightness of 1%). This makes it necessary to remove these stumbling blocks.

First, how to achieve a reduction in LED current start-up time will be discussed.

As described above, a start-up time of 300 82 s (corresponding to a brightness of 6%) controlled by the soft-start function is longer than a target value of 50 μs (corresponding to a brightness of 1%), which is a stumbling block to achieving a reduction in LED current start-up time.

Figure 34:
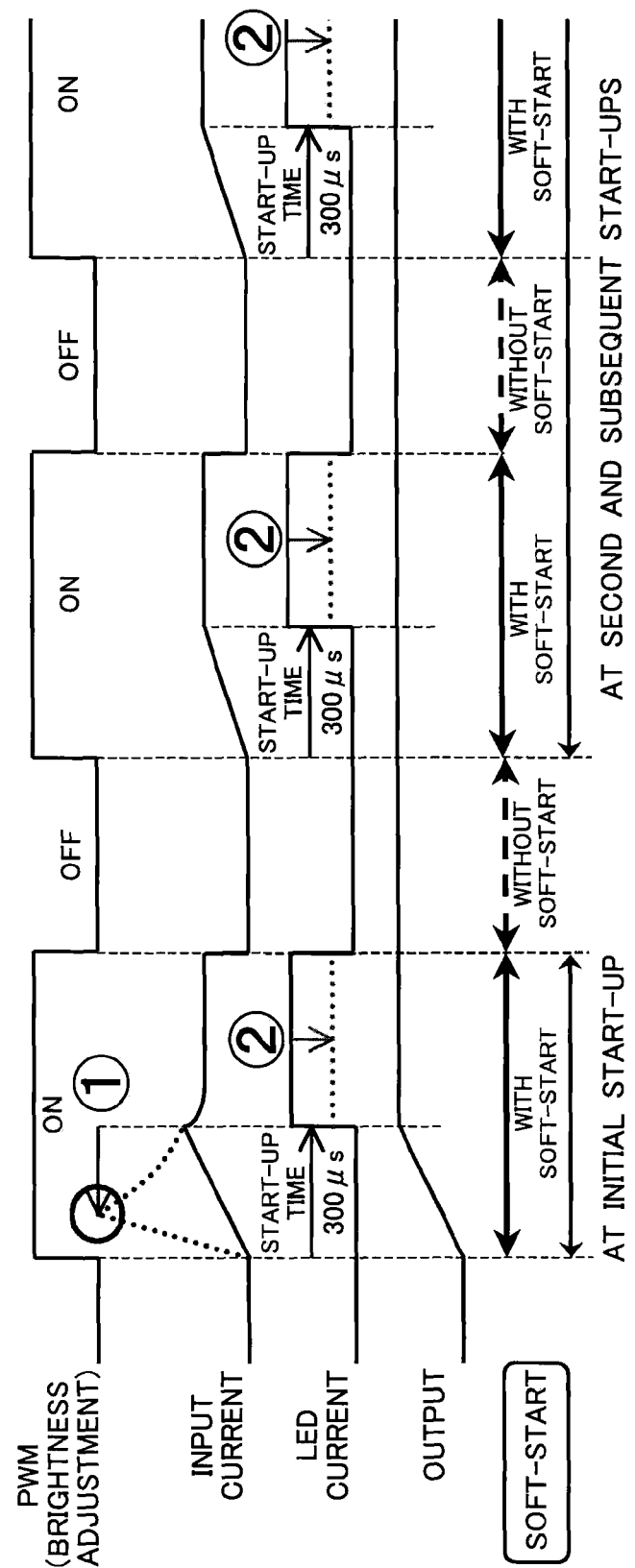
FIG. 34 is a diagram illustrating a first problem to be solved to achieve reduction in start-up time of the LED current.

To achieve a reduction in start-up time, a set value for start-up time itself may be shortened. However, doing so can increase a peak of an input current at initial start-up (see point A in FIG. 34). Alternatively, an input current may be reduced by adjusting an overcurrent limit. However, doing so can prevent the LED current from reaching a target value when the battery voltage is low (see point B in FIG. 34).

Thus, the semiconductor device 10 of this embodiment is so configured that, at initial start-up, soft-start is performed as usual, such that the start-up time becomes 300 μs, and, at the second and subsequent start-ups, soft-start is disabled, such that the start-up time becomes zero. With this configuration, it is possible to reduce the start-up time at the second and subsequent start-ups while appropriately regulating a peak current at initial start-up.

Figure 35:
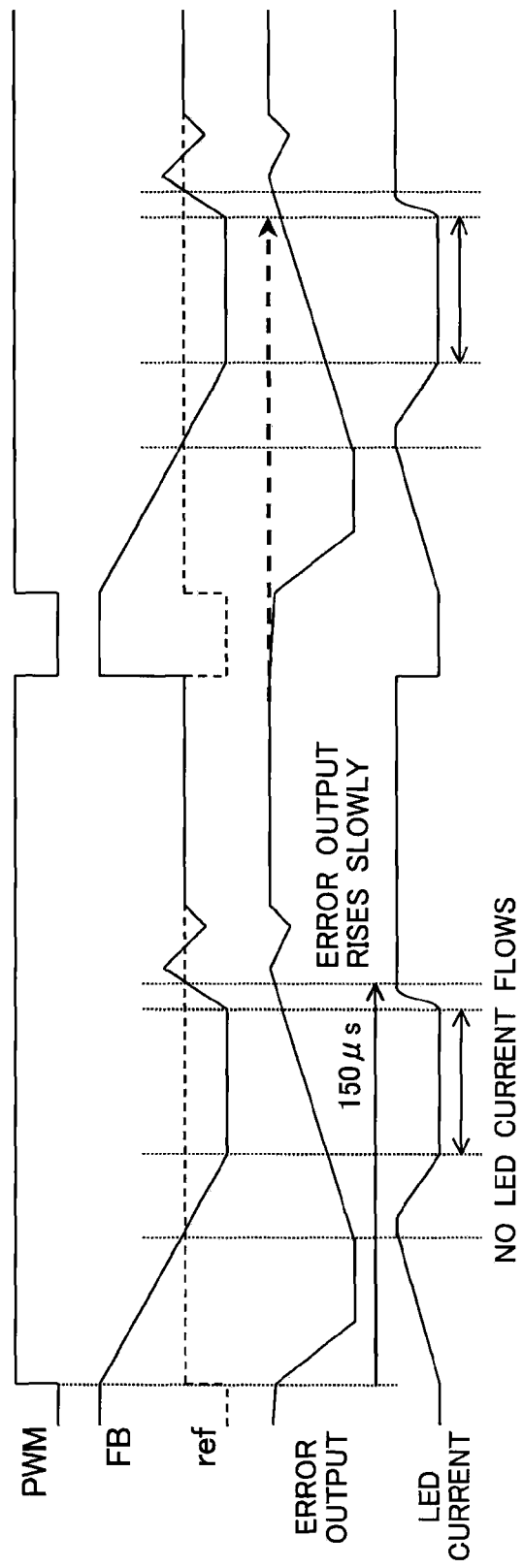
FIG. 35 is a diagram illustrating a second problem to be solved to achieve reduction in start-up time of the LED current.

However, as described above, the response time of the DC/DC converter (150 μs, which corresponds to a brightness of 3%) is longer than a target value of 50 μs (corresponding to a brightness of 1%) as shown in FIG. 35, which is another stumbling block to achieving a reduction in LED current start-up time. Unless this stumbling block is removed, it is impossible to achieve a target LED current rise time.

To reduce the response time of the DC/DC converter, the CR time constant of a phase compensation circuit connected to the output node of the error amplifier, which is a component of the DC/DC converter, may be made smaller so as to shorten a rise time of an output voltage of the error amplifier. However, doing so necessitates changing the capacitance of the output capacitor from 2.2 μF to 20 μF to prevent system oscillation. From a viewpoint of mounting area, however, it is difficult to mount an output capacitor having a withstand voltage of 50 V and a capacitance of 20 μF on a thin panel.

Thus, instead of shortening a rise time of an error output, the semiconductor device 10 of this embodiment is so configured that, from a viewpoint of reducing the amount of change required for the rise of an error output, a previous value of an error output (an error output obtained before the PWM signal is turned off) is retained until the rise of the LED current, so as to shorten an LED current start-up time.

Figure 36:
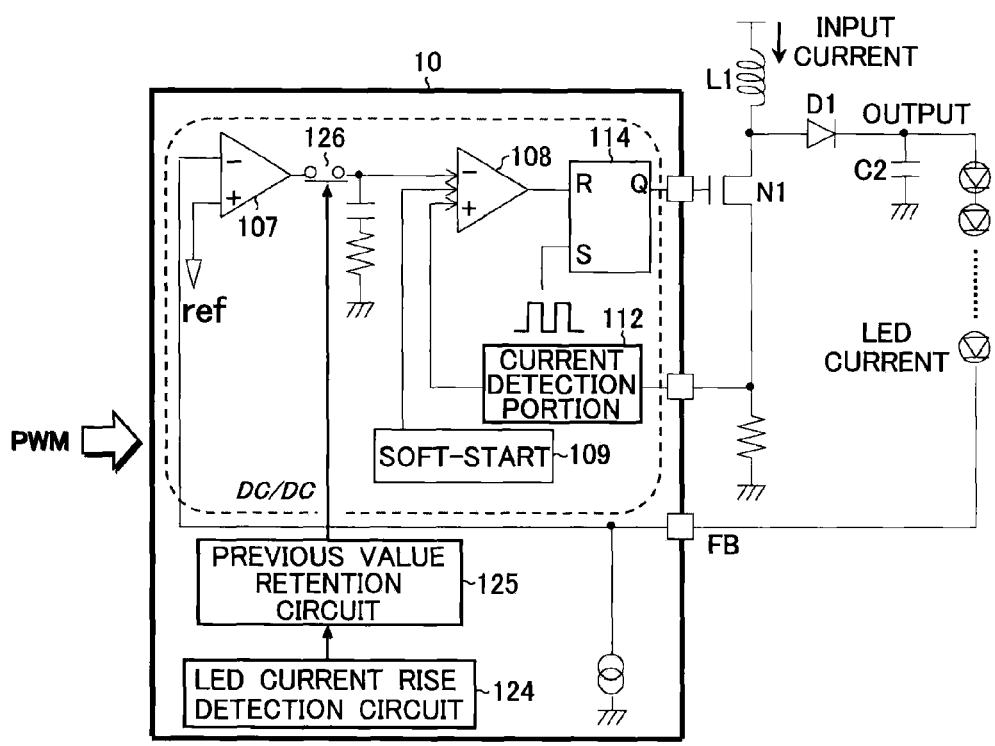
FIG. 36 is a block diagram showing an example of the configuration for achieving retention of a previous value of an error output.

Specifically, as shown in FIG. 36, the semiconductor device 10 of this embodiment includes a detection circuit 124 detecting rise of the LED current, a previous value retention circuit 125 producing a timing signal for retaining (turning off a switch 126) a previous value of an error output from the time when the PWM signal is turned to a low level until the time when rise of the LED current is detected, and a switch 126 that is connected to the output node of the error amplifier 107 and is subjected to on/off control according to the timing signal from the previous value retention circuit 125.

The above-described detection circuit 124 has two configurations. Of these configurations, one is a configuration in which rise of the LED current is checked, and the other is a configuration in which the LED terminal voltage is checked whether it has reached a predetermined threshold value or not. Either one or both of these configurations may be adopted.

Figure 37:
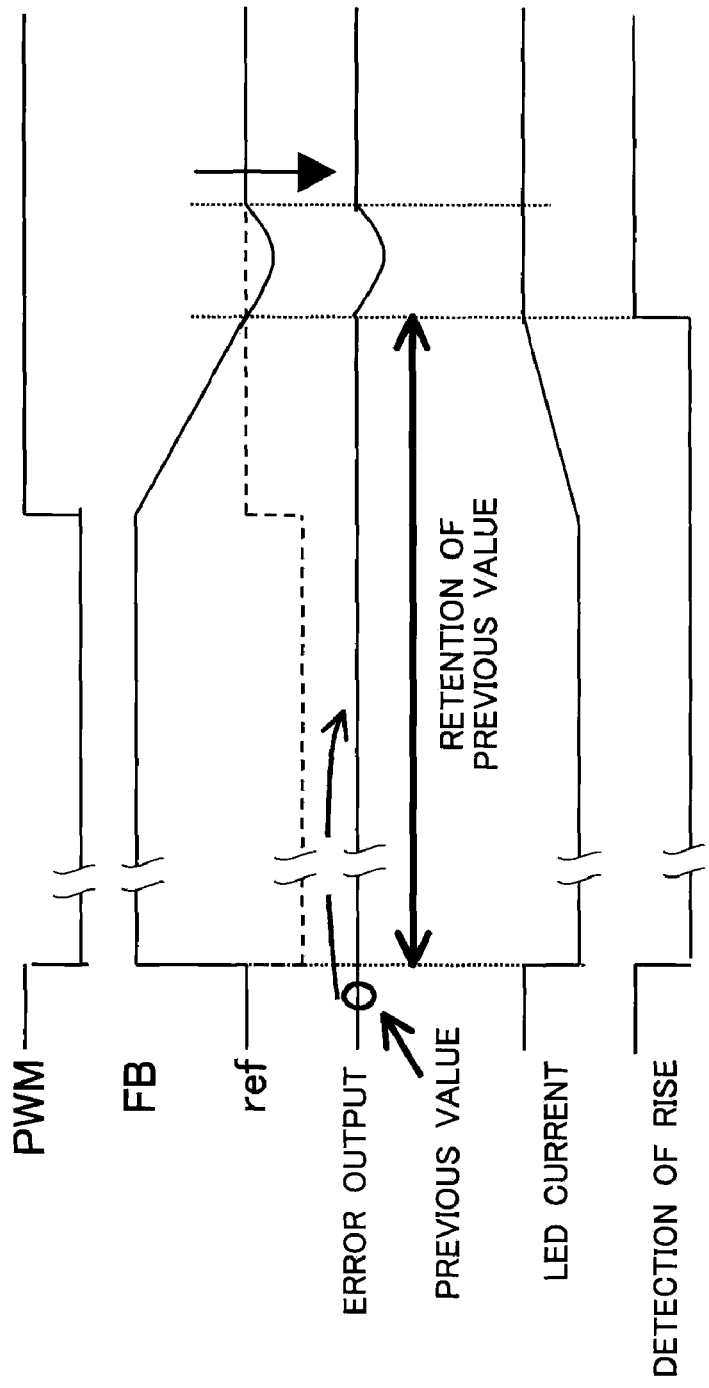
FIG. 37 is a timing chart illustrating high-speed start-up of the LED current by retention of a previous value of an error output.
Figure 38:
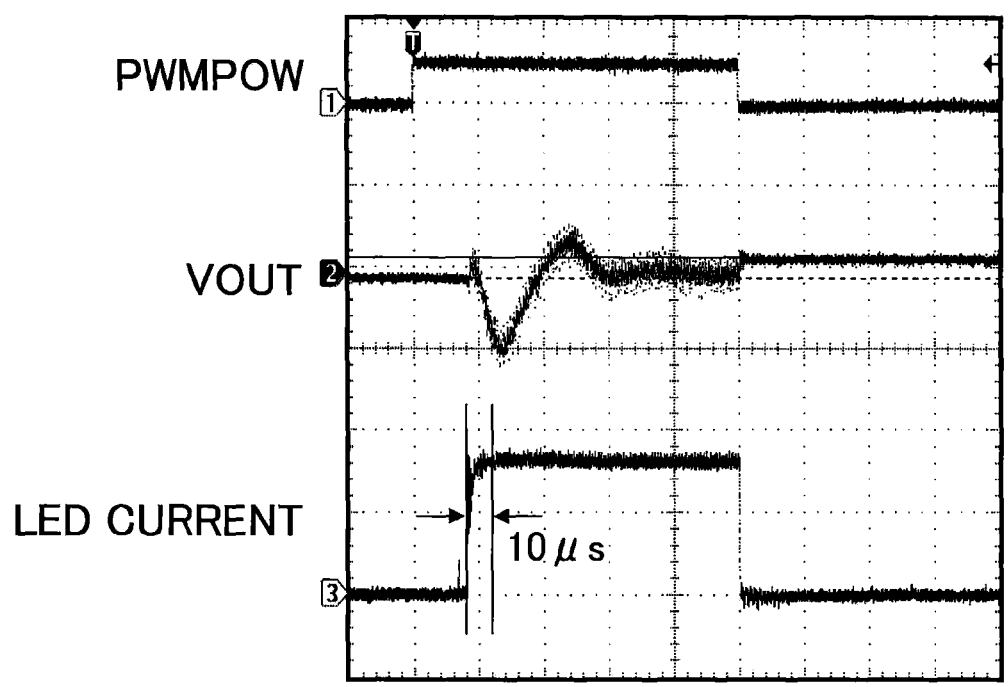
FIG. 38 is a timing chart showing an LED current behavior at the time of power control dimming.
Figure 39:
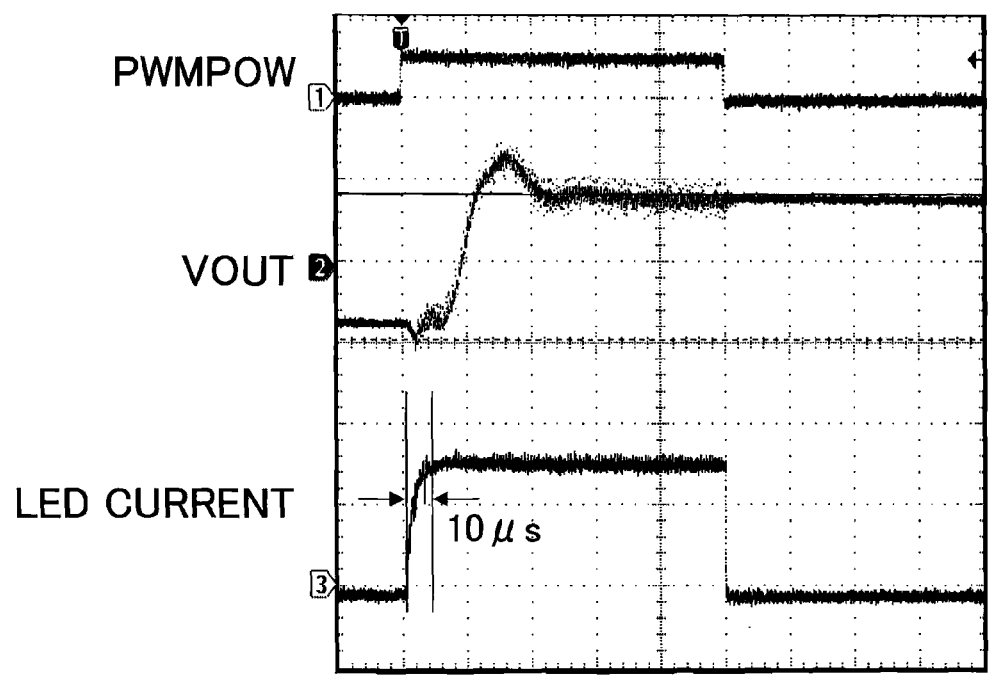
FIG. 39 is a timing chart showing an LED current behavior at the time of current driver dimming.

As described above, with a configuration in which a capacitor for phase compensation is also used for retention of a previous value of an error output, such that a previous value of an error output is retained until the rise of the LED current, as shown in FIG. 37, the amount of change (the amount of drop) of an error output is reduced, allowing the error output to rise quickly. Thus, this configuration, when combined with the above-described on/off control of the soft-start function, makes it possible to achieve an LED current rise time of 10 μs (corresponding to a brightness of 0.2%). Incidentally, FIG. 38 shows an LED current behavior at the time of power control dimming, and FIG. 39 shows an LED current behavior at the time of current driver dimming.

Figure 40:
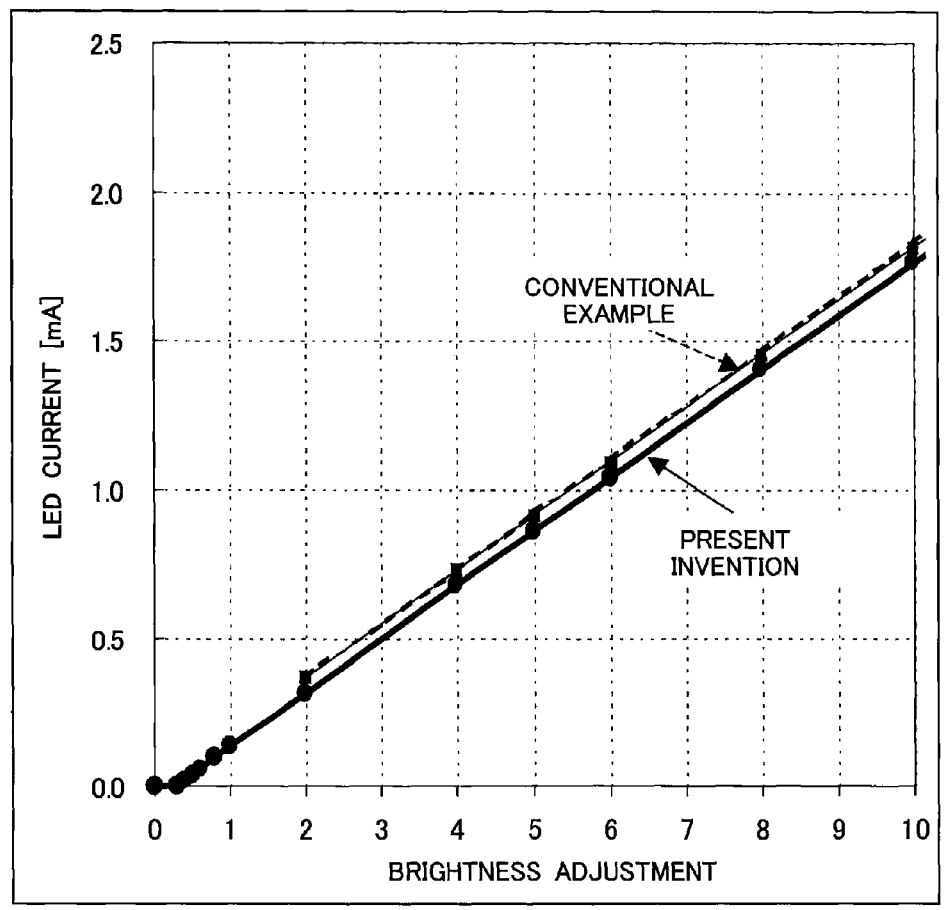
FIG. 40 is a diagram showing the correlation between a brightness adjusted value and an LED current.
Figure 41:
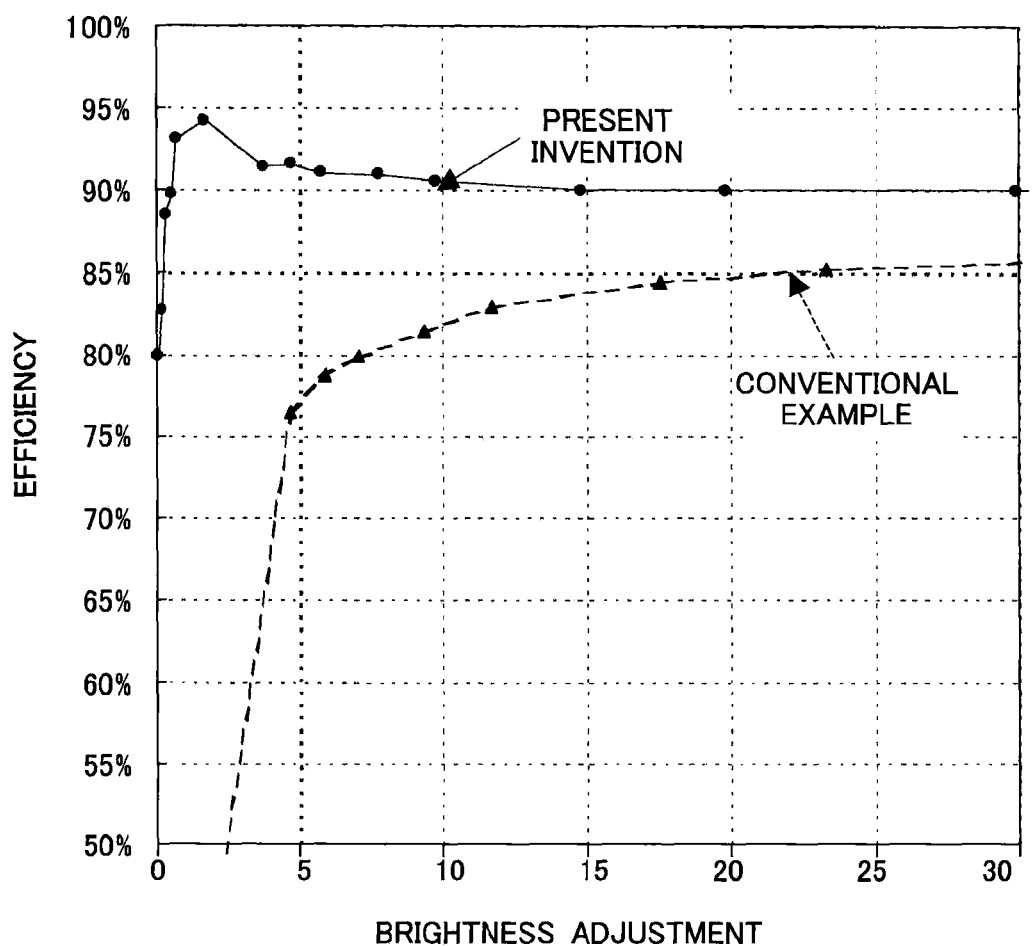
FIG. 41 is a diagram showing the correlation between a brightness adjusted value and efficiency.

As a result of improvements described above, as shown in FIG. 40, the semiconductor device 10 of this embodiment can adjust the LED brightness to a brightness level that is much lower than a brightness of 1%, specifically, over a range of from 0.2 to 100%. In addition, as shown in FIG. 41, regardless of the level of brightness, it is possible to achieve a high degree of efficiency throughout a range of brightness adjustment. In particular, it is possible to substantially increase efficiency when adjusting the brightness to a lower level, and substantially extend battery life (by 15 minutes or longer).

Furthermore, in addition to an extremely small mount area, a retention of a previous value of an error output helps reduce variations in output voltage, as shown in FIG. 42, making it possible to prevent a sound attributable to an output capacitor.

Next, how to appropriately perform on/off control of the soft-start function even when a high level period (on period of the LED) of the PWM signal is set short will be explained.

Figure 43:
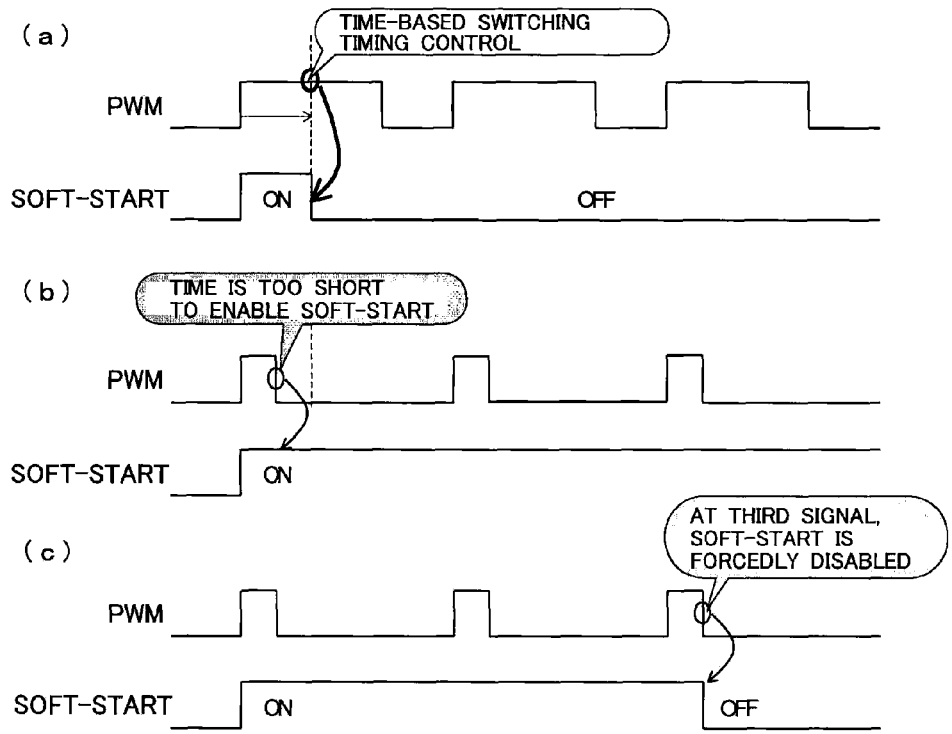
FIG. 43 is a diagram illustrating on/off control of a soft-start function.

In the semiconductor device 10 of this embodiment, control is performed such that the soft-start function is disabled when a predetermined time elapses after the PWM signal is turned to a high level. In this case, if the PWM signal has a high level period of sufficient length, as shown in FIG. 43A, it is possible to finish counting the predetermined time within a first high level period of the PWM signal, and use this as a trigger to disable the soft-start function. However, in a case where a high level period of the PWM signal is set short, as shown in FIG. 43B, it may be impossible to finish counting the predetermined time within a first high level period of the PWM signal, making it impossible to produce a trigger for disabling the soft-start function.

Thus, the semiconductor device 10 of this embodiment is so configured as to count the number of pulses (for example, falling edges) of the PWM signal, and disable soft-start forcedly when the third pulse is detected. With this configuration, even when a high level period of the PWM signal is set short, it is possible to appropriately perform on/off control of the soft-start function.

Next, how to maintain normal operation of the LED driver even when a regular PWM signal is not outputted from the other IC that controls the LED driver will be explained.

As described earlier, the semiconductor device 10 of this embodiment includes the LED terminal detecting portion 116, and is so configured that the LED terminals to be used are each connected to the cathode of a corresponding LED, and the LED terminals that are not to be used are connected to the ground.

Figure 44:
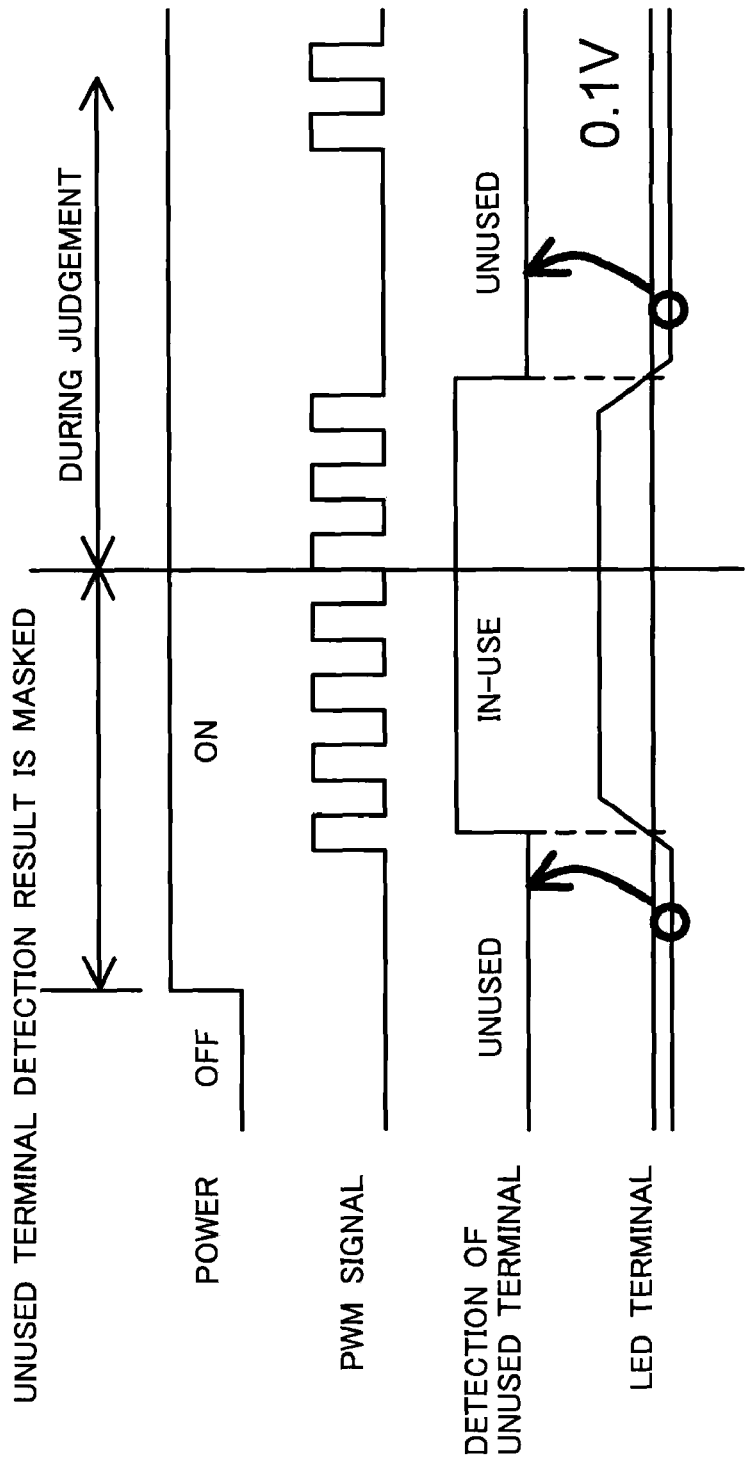
FIG. 44 is a diagram illustrating an error in LED terminal detection operation.

Here, in a configuration in which an LED terminal is judged to be an unused terminal if the LED terminal voltage of that LED terminal is lower than a predetermined threshold value (for example, 0.1 V), the following problem arises. As shown in FIG. 44, even an LED terminal that is judged to be an in-use terminal may be detected as an unused terminal due to a reduction in the LED terminal voltage thereof if an interval (low level interval) in which the PWM signal is erroneously stopped for some reason (for example, a software bug of a graphic chip) appears, whereby step-up operation of the DC/DC converter is stopped. As a result of such an unintended stop, a reset signal has to be input. This reduces the usability for the users.

Figure 45:
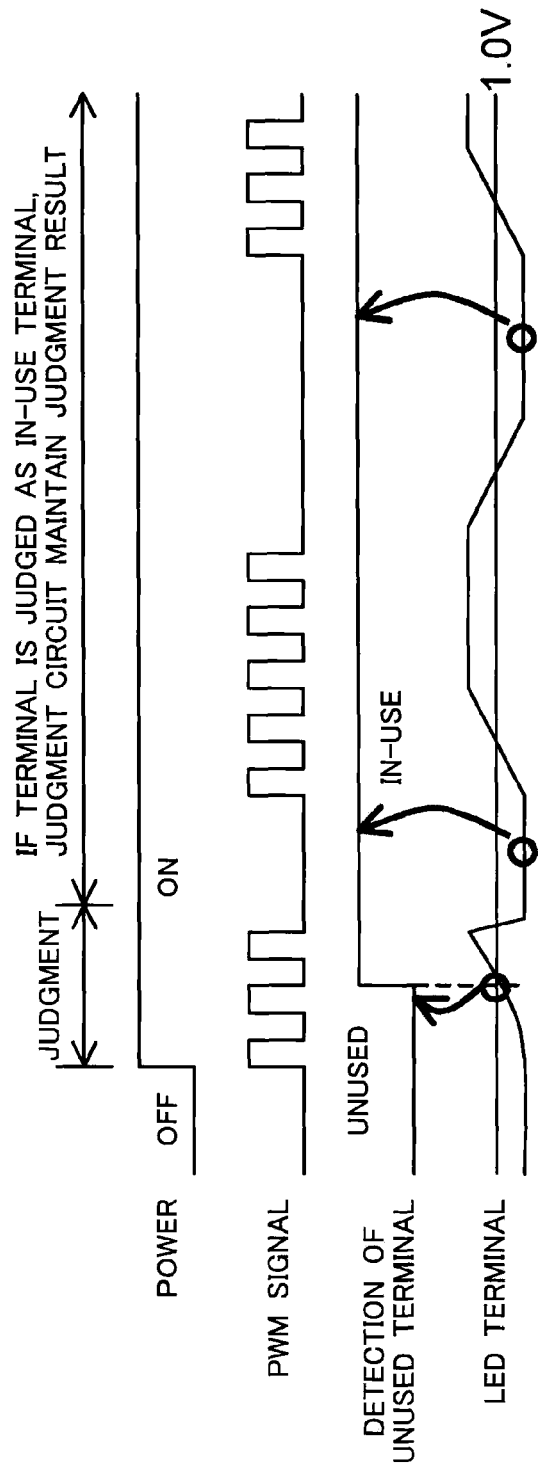
FIG. 45 is a diagram illustrating an example of operation of the LED terminal detecting portion 116.

Thus, as shown in FIG. 45, the semiconductor device 10 of this embodiment is so configured that an LED terminal is detected as an in-use terminal if the LED terminal voltage thereof once exceeds 1.0 V, and that LED terminal is not detected as an unused terminal even when the LED terminal voltage thereof is reduced. That is, a judgment as to whether an LED terminal is an in-use terminal or not is made at power on, and, for the LED terminal that is once judged to be an in-use terminal, the judgment result is maintained, eliminating the possibility that that LED terminal is judged to be an unused terminal later. As a result) even if the PWM signal is instantaneously stopped for some reason, it is possible to turn on the LEDs again without any problem when the PWM signal starts to be fed again.

Next, with reference to FIG. 46, how to reduce noise attributable to the LED terminal voltage will be explained.

Figure 46:
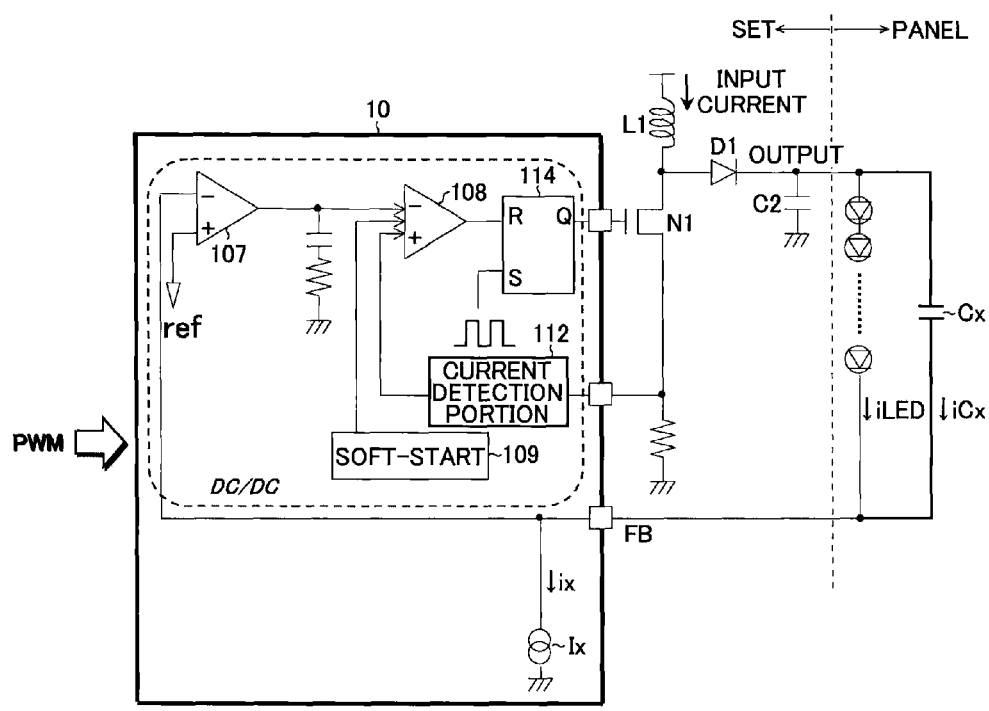
FIG. 46 is a block diagram showing an example of the configuration to reduce noise attributable to the LED terminal voltage.

FIG. 46 is a block diagram showing an example of the configuration to reduce noise attributable to the LED terminal voltage.

With an improvement in power of a constant current source Ix producing a constant current ix, an LED terminal voltage VFB may be dropped suddenly, causing considerable noise. Thus, the LED drive unit of this embodiment includes a capacitor Cx for noise reduction that is connected in parallel with the load, namely the LEDs. With this configuration, at start-up of the constant current source Ix, a charging current iCx first flows through the capacitor Cx. This allows an LED current iLED to rise gently. That is, it is possible to reduce noise by adjusting the slope with which the LED terminal voltage VFB drops by the capacitance value of the capacitor Cx.

Figure 47:
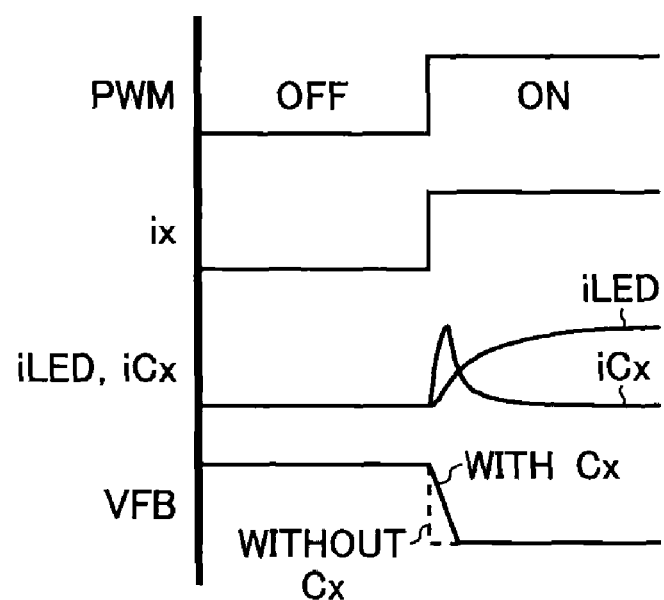
FIG. 47 is a diagram illustrating how to reduce noise attributable to the LED terminal voltage.

FIG. 47 is a diagram illustrating how to reduce noise attributable to the LED terminal voltage, showing from above the behaviors of a PWM signal, a constant current ix, an LED current iLED, a charging current iCx, and an LED terminal voltage VFB.

Although FIG. 46 deals with a case in which the capacitor Cx is provided on the panel side, the present invention is not limited to this specific configuration, but may be so implemented that the capacitor Cx is provided on the set side.

Although the embodiment described above deals with a case in which the present invention is applied to a semiconductor device that controls the driving of a backlight of a medium-sized LCD panel incorporated in mobile notebook-size personal computers, portable DVD players, car navigation system, and the like, the present invention is not limited to this specific application. The present invention finds wide application in load drive units of any other types.

The invention may be practiced in any other manner than specifically described above, with any modification or variation made within the spirit of the invention.

In terms of industrial applicability, the invention is suitable for use in drive units that control the driving of a load (such as an LED backlight of a medium-sized LCD panel).

While the present invention has been described with respect to preferred embodiments, it will be apparent to those skilled in the art that the disclosed invention may be modified in numerous ways and may assume many embodiments other than those specifically set out and described above. Accordingly, it is intended by the appended claims to cover all modifications of the present invention which fall within the true spirit and scope of the invention.

What is claimed is:

1. A switching regulator that turns on and off an input voltage to thereby convert the input voltage into a desired output voltage and feeds the output voltage to a load, comprising:
   a switching device that turns on and off the input voltage;
   a control IC that controls the switching device between on and off states by using a PWM signal;
   a smoothing capacitor that smooths an output of the switching device to produce the output voltage fed to the load; and
   a semiconductor substrate on which the switching device, the control IC, and the smoothing capacitor are disposed,
   wherein
   the smoothing capacitor comprises two smoothing capacitors which are electrically connected in parallel with each other between an output end of the switching device and ground,
   the two smoothing capacitors are physically disposed parallel to each other on a same face of the semiconductor substrate;
   the drive frequency of the PWM signal is from 20 Hz to 20 kHz; and a GND conductor is singly connected to one end of the smoothing capacitor.

2. A switching regulator that turns on and off an input voltage to thereby convert the input voltage into a desired output voltage and feeds the output voltage to a load, comprising:
- a switching device that turns on and off the input voltage;
- a control IC that controls the switching device between on and off states by using a PWM signal;
- a smoothing capacitor that smooths an output of the switching device to produce the output voltage fed to the load; and
- a semiconductor substrate on which the switching device, the control IC, and the smoothing capacitor are disposed, wherein
the smoothing capacitor comprises two smoothing capacitors which are electrically connected in parallel with each other between an output end of the switching device and ground,
the two smoothing capacitors are physically disposed perpendicular to each other on a same face of the semiconductor substrate;
the drive frequency of the PWM signal is from 20 Hz to 20 kHz; and
a GND conductor is singly connected to one end of the smoothing capacitor.

3. A switching regulator that turns on and off an input voltage to thereby convert the input voltage into a desired output voltage and feeds the output voltage to a load, comprising:
- a switching device that turns on and off the input voltage;
- a control IC that controls the switching device between on and off states by using a PWM signal;
- a smoothing capacitor that smooths an output of the switching device to produce the output voltage fed to the load; and
- a semiconductor substrate on which the switching device, the control IC, and the smoothing capacitor are disposed, wherein
the smoothing capacitor comprises two smoothing capacitors which are electrically connected in parallel with each other between an output end of the switching device and ground,
the two smoothing capacitors are physically disposed perpendicular to each other on front and back faces, respectively, of the semiconductor substrate;
the drive frequency of the PWM signal is from 20 Hz to 20 kHz; and
a GND conductor is singly connected to one end of the smoothing capacitor.

4. The switching regulator according to any one of claims 1 to 3, wherein the two smoothing capacitors are of a same type.

5. The switching regulator according to claim 1, wherein the two smoothing capacitors are physically disposed next to each other.

6. A notebook-type personal computer comprising the switching regulator according to any one of claims 1-3 and an LCD panel as the load.

7. A car navigation system comprising the switching regulator according to any one of claims 1-3 and an LCD panel as the load.

* * * * *